United States Patent
Kits Van Heyningen et al.

(10) Patent No.: US 9,838,749 B2
(45) Date of Patent: Dec. 5, 2017

(54) SYSTEM AND METHODS FOR PROVIDING CONTENT TO VEHICLES

(71) Applicant: KVH Industries, Inc., Middletown, RI (US)

(72) Inventors: Martin A. Kits Van Heyningen, Newport, RI (US); John Croy, Middletown, RI (US); Stephen Mark Haythornthwaite, Leeds (GB); Daniel Murray Benson, Newport, RI (US); Robert Balog, Wrentham, MA (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 15/109,019

(22) PCT Filed: Nov. 7, 2014

(86) PCT No.: PCT/US2014/064496
§ 371 (c)(1),
(2) Date: Jun. 29, 2016

(87) PCT Pub. No.: WO2015/116284
PCT Pub. Date: Aug. 6, 2015

(65) Prior Publication Data
US 2016/0360280 A1 Dec. 8, 2016

Related U.S. Application Data

(60) Provisional application No. 61/933,958, filed on Jan. 31, 2014.

(51) Int. Cl.
*H04N 21/214* (2011.01)
*H04N 21/2543* (2011.01)
(Continued)

(52) U.S. Cl.
CPC ....... *H04N 21/6143* (2013.01); *H04L 1/0002* (2013.01); *H04L 67/325* (2013.01);
(Continued)

(58) Field of Classification Search
CPC ................. H04N 21/214; H04N 21/2543
See application file for complete search history.

(56) References Cited

U.S. PATENT DOCUMENTS 8,014,771 B2   9/2011  Bettinger et al.
2002/0087992 A1*  7/2002  Bengeult ............ H04B 7/18508
                                                           725/76
(Continued)

FOREIGN PATENT DOCUMENTS

WO    WO 01/63800    8/2001

OTHER PUBLICATIONS

International Search Report and Written Opinion for Application No. PCT/US2014/064496 dated Apr. 3, 2015.
(Continued)

*Primary Examiner* — Hunter B Lonsberry
(74) *Attorney, Agent, or Firm* — Wolf, Greenfield & Sacks, P.C.

(57) ABSTRACT

Systems and methods are disclosed for delivering programming content to vehicles (e.g., seagoing vessels) in a cost-effective manner. In some embodiments, programming content may be delivered to vehicles over previously deployed networks (e.g., satellite networks), using excess network capacity which may not otherwise be used to deliver data. By opportunistically employing excess network capacity (e.g., as the capacity becomes available), data constituting programming content may be delivered to vehicles over a period of time, such as via multicast transmission. A vehicle may store received data on one or more onboard servers. After an item of programming content has been received, the item may be made accessible to the vehicle's crew and/or passengers, such as by streaming the item to one or more
(Continued)

suitably configured playback devices. Content may be served to playback devices "on demand" and/or according to a programming schedule.

83 Claims, 11 Drawing Sheets

(51) Int. Cl.

| | | |
|---|---|---|
| *H04N 21/61* | (2011.01) | |
| *H04L 29/08* | (2006.01) | |
| *H04W 4/04* | (2009.01) | |
| *H04W 4/06* | (2009.01) | |
| *H04N 21/414* | (2011.01) | |
| *H04L 1/00* | (2006.01) | |
| *H04N 21/472* | (2011.01) | |
| *H04N 21/6405* | (2011.01) | |

(52) U.S. Cl.
CPC . *H04N 21/41422* (2013.01); *H04N 21/47217* (2013.01); *H04N 21/6405* (2013.01); *H04W 4/046* (2013.01); *H04W 4/06* (2013.01)

(56) References Cited

U.S. PATENT DOCUMENTS

| | | | |
|---|---|---|---|
| 2002/0152470 A1* | 10/2002 | Hammond | H01Q 1/28 725/76 |
| 2003/0054816 A1 | 3/2003 | Krebs et al. | |
| 2003/0154272 A1 | 8/2003 | Dillon et al. | |
| 2005/0037706 A1* | 2/2005 | Settle | H04B 7/18586 455/12.1 |
| 2005/0252959 A1 | 11/2005 | Gaumond et al. | |
| 2008/0106376 A1* | 5/2008 | Lee | H04L 67/12 340/5.91 |
| 2008/0141315 A1 | 6/2008 | Ogilvie | |
| 2011/0271306 A1 | 11/2011 | Kahn et al. | |

OTHER PUBLICATIONS

Extended European Search Report for Application No. EP 16184887.4 dated Sep. 16, 2016.
Extended European Search Report for Application No. EP 16184888.2 dated Oct. 4, 2016.
Tohru Kondo, Implementation and Evaluation of the Robust High-Quality Video Transfer System on the Broadband Internet, Applications and the Internet, 2004, Proceedings, 2004 International Symposium on Tokyo, Japan, Jan. 26-30, 2004, Los Alamitos, CA, IEEE Compt. Soc. U.S. Jan. 26, 2004, pp. 135-141, XP010682403.
Office Action for Panamanian Application No. 91262, dated Mar. 10, 2017, 2 pages.
U.S. Appl. No. 15/723,902, dated Oct. 3, 2017, Kits van Heyningen et al.
Extended European Search Report for European Application No. 14881289.4, dated Sep. 19, 2017.

* cited by examiner

SYSTEM AND METHODS FOR PROVIDING CONTENT TO VEHICLES

RELATED APPLICATIONS

This application is a national phase filing under 35 U.S.C. §371 of International Application No. PCT/US2014/064496, filed on Nov. 7, 2014, entitled "Systems and Methods for Providing Content to Vehicles," which claims the benefit of the filing date of U.S. Provisional Patent Application Ser. No. 61/933,958, filed on Jan. 31, 2014, entitled "System And Methods For Delivery Of Content To Seagoing Vessels." Each of the above-referenced applications is incorporated herein by reference in its entirety.

BACKGROUND

Conventionally, distributors of audio and/or video programming content (e.g., movies, TV shows, news content, sporting events, educational content, etc.) do not make the programming content available via mass communications media (e.g., via over-the-air terrestrial broadcast networks, cable networks, satellite networks, etc.) to seagoing vessels in international waters (i.e., outside the territorial waters of any sovereign nation). As a result, when seagoing vessels exceed a certain distance from shore, they are outside the range at which programming content can be received via conventional mass communications media.

SUMMARY

The Applicant has appreciated that, in general, the mass distribution of programming content to consumers is economically viable because the significant costs associated with delivering the programming content (e.g., building and/or maintaining a broadcast, cable and/or satellite network) are offset by revenue earned as a result of a large population of users consuming the programming content. The Applicant has also appreciated, however, that the number of potential users aboard vessels in international waters at any one time is relatively small. Moreover, these vessels are often dispersed across the globe, meaning that to be able to deliver programming content to all potential users, a distributor would need to manage a satellite network capable of transmitting to all ocean regions. As a result, distributing programming content to seagoing vessels using prior techniques is not economically viable.

Employing point-to-point communications (e.g., streaming, such from a source accessible over the Internet) to deliver programming content to seagoing vessels in international waters is similarly problematic from an economic standpoint. In this respect, transmitting data to seagoing vessels using conventional point-to-point communication techniques currently costs around $2 per megabit, meaning that it costs around $80 to transmit a typical song, around $16,000 to transmit a typical 2 gigabyte movie, and around $320,000 to transmit a Blu-Ray movie. Vessel operators are generally not willing to pay such high amounts to have programming content delivered to a vessel while it is at sea.

To remedy the deficiencies associated with prior approaches, some embodiments of the present invention are directed to systems and methods for delivering programming content to seagoing vessels in a cost-effective manner. For example, in some embodiments of the invention, programming content may be delivered to vessels over previously deployed networks (e.g., satellite networks), using excess network capacity which would not otherwise be used to deliver data. By opportunistically employing excess network capacity (e.g., as the capacity becomes available), some embodiments of the invention may deliver the data that constitutes programming content to seagoing vessels over a period of time, via a "trickle feed." In some embodiments, the data may be transmitted via multicast, whereby a single transmission is directed to multiple destinations, thereby obviating the need to administer multiple separate point-to-point transmissions. By opportunistically transmitting data via multicast over previously unused network bandwidth, some embodiments of the invention may enable delivery of programming content to seagoing vessels with minimal additional network infrastructure investment, and without disrupting existing network traffic.

In some embodiments, a seagoing vessel may store received data on one or more onboard servers. After an item of programming content has been received, the item may be made accessible to the vessel's crew and/or passengers, such as by streaming the item to one or more suitably configured onboard playback devices. Content may be served to playback devices "on demand" and/or made available according to a programming schedule. Because some embodiments of the invention provide for the server(s) and playback devices to be co-located (i.e., onboard the vessel), content may be delivered, and playback commands may be processed, much more quickly than if the content were delivered in real-time from a remote server, as it is in conventional mass distribution schemes. As a result, some embodiments may not only enable cost-effective delivery of programming content to a relatively small number of highly dispersed seagoing vessels, but also provide a user-friendly playback experience as well.

It should be appreciated that the foregoing is a non-limiting summary of only some embodiments of the invention, and is intended to describe advantages associated with only those particular embodiments. For example, the invention is not limited to being used to deliver content to seagoing vessels, and may be used to deliver content to any suitable vehicle, configured for travel via sea, land and/or air.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Some embodiments of the invention are directed to systems and methods for cost-effectively delivering unitary items of programming content via satellite to vehicles (e.g., vessels in international waters), for playback on the vehicles. (As used herein, the term "unitary item of programming content" refers to any self-contained, undivided item of programming content, such as a movie, television show, sporting event, educational video, song, podcast, body of program instructions (e.g., one or more hypertext markup language (HTML) pages), file, document (e.g., slide show, presentation, chart, diagram, etc.) or other unabridged item of content.) In some embodiments, programming content may be delivered to vehicles over previously deployed satellite networks, utilizing network bandwidth which may otherwise not be employed to deliver data to the vehicles. By opportunistically exploiting this excess capacity, some embodiments of the invention may provide for delivering the data that constitutes programming content to vehicles over a period of time. In some embodiments, data may be transmitted via multicast, whereby a single transmission is directed to multiple destinations, thereby obviating the need to administer multiple separate point-to-point transmissions. By transmitting the data via multicast over previously unused network bandwidth, some embodiments of the invention may enable programming content to be delivered to vehicles with minimal additional network infrastructure investment, and without disrupting existing network traffic. In some embodiments, a vehicle may store received data on one or more onboard servers as it is received. After some or all of the data that constitutes an item of programming content is received, the item may be made available to the vehicle's passengers and/or crew, such as by streaming the item to one or more playback devices.

Figure 1:
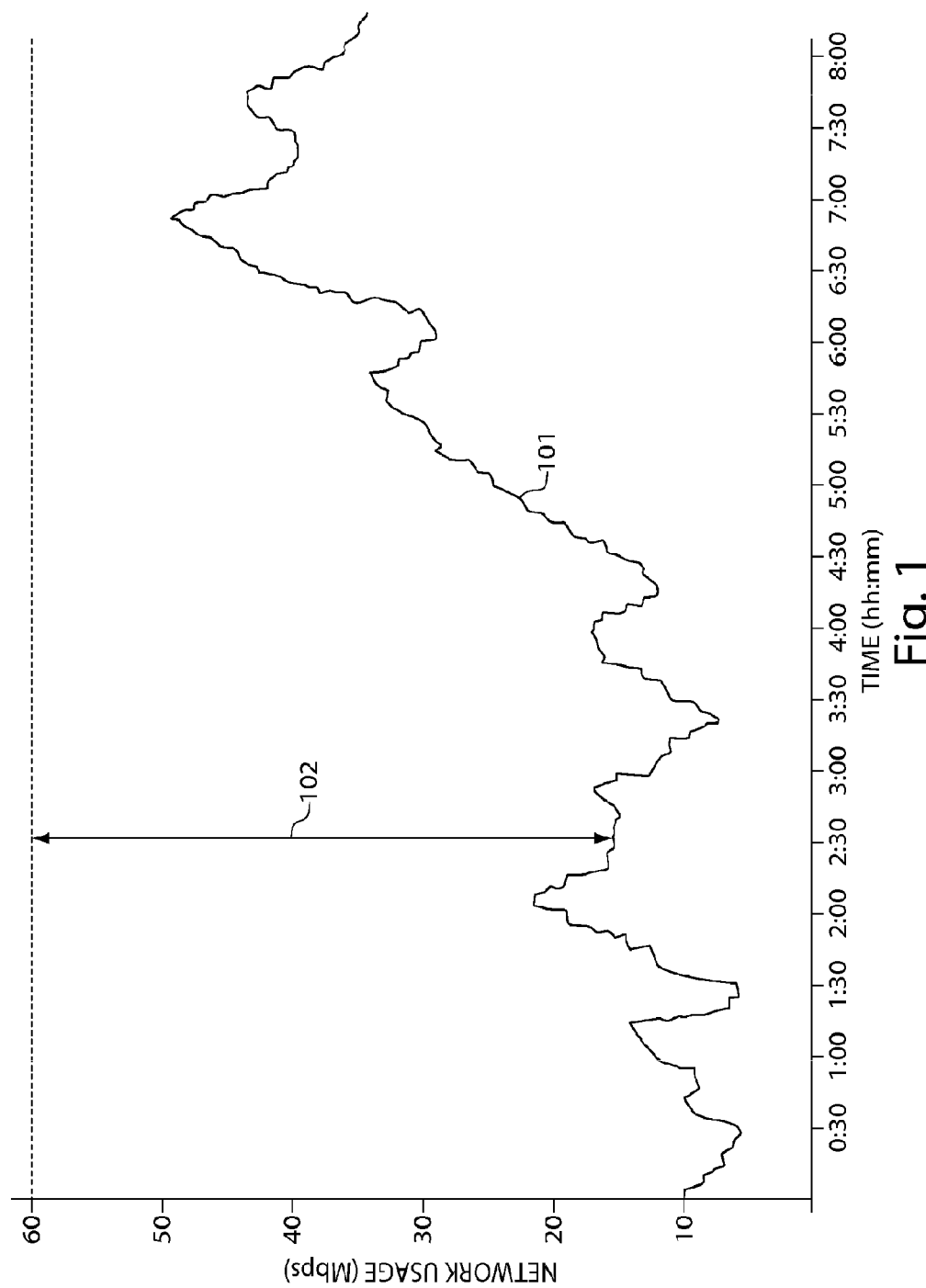
FIG. 1 is a line graph depicting representative forward link network traffic on a satellite beam during a representative time period.

FIG. 1 illustrates the excess network capacity which may be exploited to deliver programming content to seagoing vessels during a representative time period. Specifically, FIG. 1 is a bar graph showing a representative amount of forward link (i.e., outbound transmissions to seagoing vessels) IP traffic traveling over an existing satellite's sixty megabit per second (Mbps) beam over an eight hour period, from twelve o'clock (i.e., 0:00) to eight o'clock (8:00). The amount of data being transmitted at any one time is indicated by contour 101. It should be appreciated that a satellite's total transmission capacity is generally established so as to support peak network loads (e.g., the amount of data that contour 101 indicates is being transmitted just prior to 7:00 in FIG. 1), so that the satellite is capable of handling network traffic in a timely manner during these periods. It can be seen from FIG. 1 that during non-peak periods (e.g., around 1:00 in FIG. 1), a significant amount of the satellite's transmission capacity goes unused. Indicator 102 illustrates the amount of excess capacity on the network at about 2:30.

The Applicant has appreciated that, on average, about half of a satellite's transmission capacity goes unused, and that this excess capacity provides an opportunity to send additional information (e.g., programming content) to vehicles without impairing the network's ability to handle other traffic. By opportunistically employing this previously unused bandwidth, some embodiments of the invention may enable cost-effective delivery of programming content to vehicles, by using network resources which previously had not been deployed to their full capacity.

Figure 2:
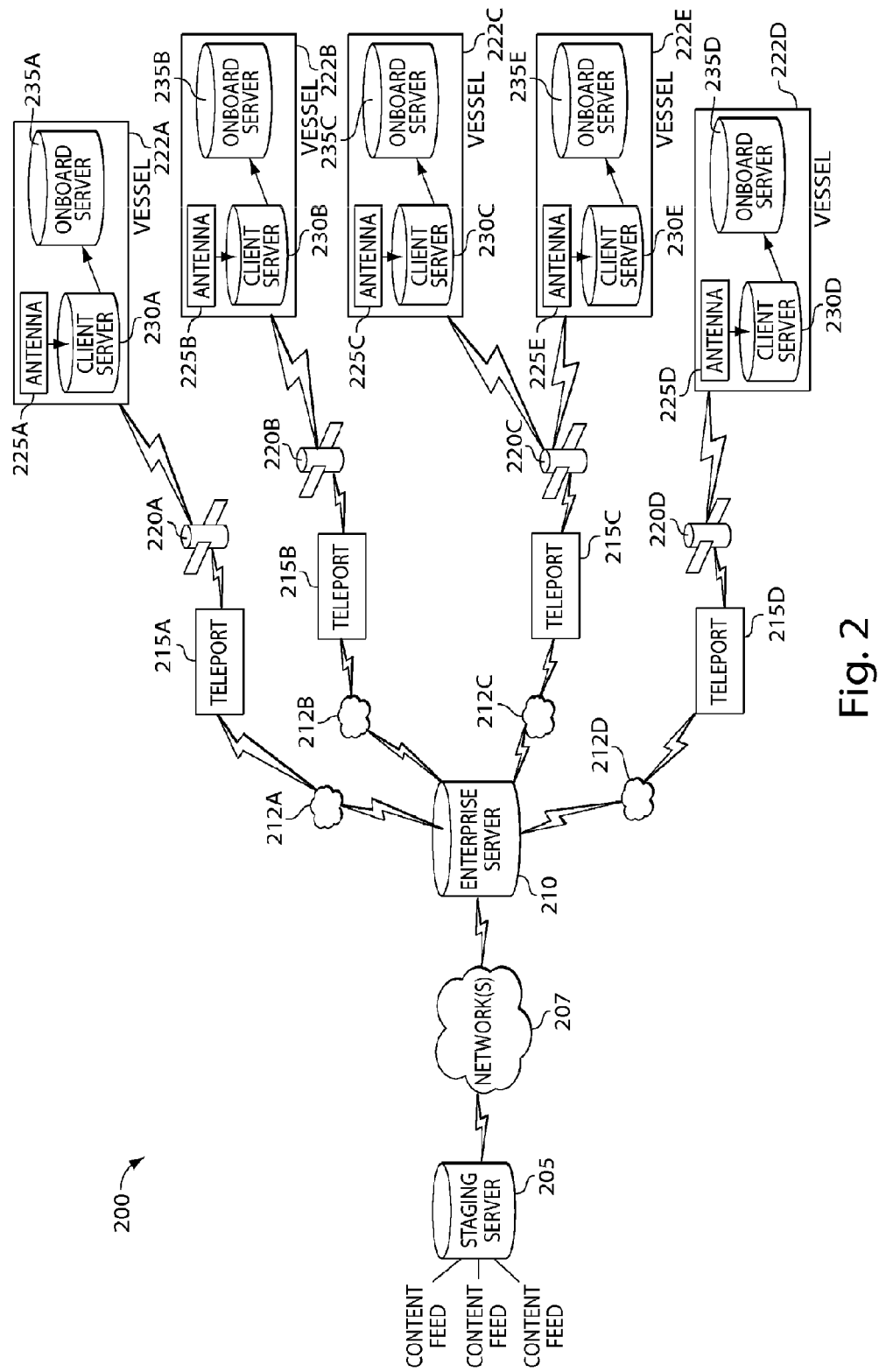
FIG. 2 is a block diagram depicting components of a representative system for delivering programming content to vehicles, in accordance with some embodiments of the invention.

FIG. 2 depicts components of a representative system 200 for delivering programming content to a representative set of vehicles (i.e., seagoing vessels). In summary, FIG. 2 depicts one or more content feeds being provided to a staging server 205, which transmits the feed(s) to enterprise server 210. Enterprise server 210 then provides data constituting items of programming content to teleports 215A-215D, which then cause this data to be transmitted via a corresponding one of satellites 220A-220D. Once received by the antenna 225 of a vessel 222 in the area served by one of satellites 220, the data is provided to a client server 230 aboard the vessel 222, and then made available for onboard playback by server 235. Additional detail on the flow of data among the components shown in FIG. 2 is provided below.

In representative system 200, one or more content feeds (e.g., live content feeds, content stored on DVD, and/or any other suitable content feed(s)) are received and stored by staging server 205. Any suitable type of content may be received by staging server 205. For example, movies, television shows, news clips, televised sporting events, educational content, bodies of program instructions, files, documents (e.g., charts) and/or one or more other types of content may be received by staging server 205. Feeds may be received and stored by staging server 205 using any suitable infrastructure and/or technique(s), as embodiments of the invention are not limited in this respect.

In representative system 200, staging server 205 bundles individual items of programming content received via a content feed into separate unitary files, for ease of transmission, storage and error correction. However, it should be appreciated that embodiments of the invention are not limited to bundling each item of programming content into a separate file. For example, each item of programming content may be packaged into multiple files, and/or other suitable data structure(s).

In some embodiments of the invention, staging server 205 may incorporate, into each file constituting an item of programming content, information which may be used for file-level error correction. As a result, some embodiments of the invention may enable an item of programming content to be reconstructed (e.g., using any suitable error correction algorithm(s), whether now known or later developed) if transmission errors occur prior to the item reaching its destination in its entirety. Any suitable error correction information (e.g., redundant data) may be incorporated into a file constituting an item of programming content, and any suitable error correction algorithm(s) may be used to correct a file for transmission and/or other errors occur, as embodiments of the invention are not limited to any particular manner of implementation.

In representative system 200, staging server 205 transmits data representing items of programming content to enterprise server 210 via network(s) 207. Network(s) 207 may employ any suitable infrastructure and/or communications protocol(s). Enterprise server 210 then provides the data to teleports 215A-215D via network(s) 212, which may also employ any suitable infrastructure and/or communications protocol(s).

Each of teleports 215A-215D may comprise any collection of components suitably configured for providing a communications link between terrestrial components (e.g., in representative system 200, enterprise server 210) and extraterrestrial components (e.g., in representative system 200, a corresponding satellite 220). Although four teleports are shown in FIG. 2, it should be appreciated that any suitable number of teleports may be employed to communicate data to satellites.

In representative system 200, each of teleports 215 communicates with a corresponding satellite 220. Thus, teleport 215A communicates with satellite 220A, teleport 215B communicates with satellite 220B, and so on. However, it should be appreciated that a teleport may communicate with any suitable number of satellites. For example, a first teleport may communicate with one satellite, another teleport may communicate with four satellites, etc. Any suitable configuration of teleports and satellites may be employed, and any suitable number of satellites may be used to transmit data to seagoing vessels, as embodiments of the invention are not limited in this respect. Further, each satellite may comprise any collection of components suitably configured for transmitting to a terrestrial terminal (e.g., an antenna 225 disposed on a corresponding seagoing vessel 222) from an extraterrestrial location.

In representative system 200, a satellite 220 may transmit data constituting items of programming content via multicast transmission, whereby a single transmission is directed to multiple destinations (e.g., vessel antennae). By transmitting programming content via multicast, some embodiments of the invention obviate the need to administer multiple separate point-to-point data transmissions to individual seagoing vessels. However, it should be appreciated that some embodiments of the invention are not limited to transmitting data via multicast, as any suitable communications protocol(s) and/or transmission technique(s) may be used. If data is transmitted via multicast, any suitable form(s) of multicast (e.g., Internet Protocol (IP) multicast, application-layer multicast, and/or any other suitable form(s)) may be used.

In representative system 200, an antenna 225 of a vessel 222 receives information transmitted by a satellite 220 to an area in which the vessel 222 is located. Thus, vessel 222A receives information transmitted by satellite 220A due to vessel 222A being located in the area serviced by satellite 220A, vessel 222B receives information transmitted by satellite 220B due to vessel 222B being located in the area serviced by satellite 220B, vessels 222C and 222E receive information transmitted by satellite 220C due to vessels 222C and 222E being located in the area serviced by satellite 220C, and so forth. Any suitable number of vessels may receive a transmission from a particular satellite. In some embodiments of the invention, transmissions originating from satellite 200 may be directional transmissions, such that each antenna 225 is oriented toward a particular satellite, and consequently receives data from only one satellite, at a particular time.

In some embodiments of the invention, a vessel 222 which receives data via an antenna 225 may demodulate the data using one or more modems (not shown in FIG. 2) and segregate data which constitutes programming content from other types of data received from satellite 220. In this respect, it should be appreciated that satellite 220 may transmit numerous types of data to a vessel, including chart data, operational data, weather information, etc. In some embodiments, this "other" data (i.e., data which does not constitute programming content) may be transmitted using techniques other than multicast, although embodiments of the invention are not limited to transmitting any type of data in any particular manner.

Data which constitutes programming content may be segregated from other data received by a vessel using any suitable technique(s). In embodiments which employ multicast to transmit items of programming content, the data constituting programming content may be identified based on its having been transmitted via multicast. In this respect, some multicast transmissions may be directed to a class of network addresses known as "Class D" IP addresses, and as a result may be identified based upon the address to which the transmission is directed. Of course, embodiments of the invention are not limited to employing multicast transmissions directed to a particular type or class of address, or to identifying the data which constitutes programming content based upon the way it is transmitted. Data constituting programming content may be identified in any suitable fashion, and embodiments of the invention are not limited to any particular manner of implementation.

In representative system 200, the data which constitutes programming content that is received by vessel antenna 225 is stored on client server 230 as it is received. In this respect, it should be apparent from the description of FIG. 1 above that because satellites are, at any particular time, often committed to transmitting a certain amount of data that does not constitute programming content (as indicated by contour 101 in FIG. 1), a satellite's capacity for transmitting programming content often varies over time. Specifically, a satellite's capacity to transmit programming content at any one time may depend in part on how much of its total transmission capacity is being used to transmit other data at that time. As such, in some embodiments of the invention, each satellite 220 may transmit data constituting programming content to vessels at a variable rate, and the transmission of an item of programming content may take an extended period of time to complete. This "trickle feed" of content to vessels is unlike conventional approaches to delivering programming content via mass communications media, which involve streaming content continuously in real-time, for real-time receipt, processing and display by a terminal device.

Because the data which constitutes an item of programming content may be received by a vessel over an extended period of time, the data may be stored by client server 230 as it is received. The data may be stored in any suitable fashion, as embodiments of the invention are not limited in this respect. In some embodiments, after a sufficient amount of data constituting a particular item of programming content has been received (e.g., after the item has been received in its entirety, after a predetermined portion has been received, and/or after any suitable reception milestone has been reached), then the data may be provided to onboard server 235, which may make it available for playback (e.g., via streaming, and/or using any other suitable delivery technique(s)) to one or more devices onboard the vessel. Any suitable device(s) may be used to play back or otherwise reproduce content, including set-top boxes, personal computing devices, handheld devices (e.g., smartphones, tablets, game consoles, etc.) and/or any other suitable type of component(s). Onboard server 235 may make content available "on demand" and/or in accordance with a schedule. The manner in which onboard server 235 makes content available for playback is described in further detail below.

It should be appreciated that, although the representative vehicles depicted in FIG. 2 are vessels at sea, some embodiments of the invention may provide for delivering content to any suitable type(s) of vehicle, including vehicles designed for travel via land, air and/or sea, and that the content delivery techniques described above may be adapted for use with vehicles of any suitable type.

It should also be appreciated that, because a vehicle may be in motion as it receives the data which constitutes an item of programming content from a satellite, it may travel outside the area serviced by the satellite prior to receiving the item in its entirety. With respect to embodiments that employ multicast transmissions, it should be appreciated that multicast generally does not provide for a protocol-level feedback loop to alert a transmission source that a particular portion of transmitted data was not properly received by a recipient, and should be re-sent. Accordingly, some embodiments of the invention provide techniques for ensuring that, if a vehicle loses contact with a satellite while the satellite transmits an item of programming content to the vehicle, the vehicle may continue to receive the item from another satellite via multicast without the transmission of the item having to be restarted.

In some embodiments of the invention, a vehicle's transition from receiving data from one satellite to receiving data from another satellite may be aided by keeping the transmissions of satellites 220A-220D relatively synchronized, so that each satellite 220 transmits the same data at about the same time. In this respect, the Applicant has appreciated that unless satellites transmit the same data at about the same time, if a vehicle receiving data from a first satellite loses contact with that satellite, and then establishes communication with a second satellite, a risk exists that the vehicle may not receive a portion of the data from either the first or the second satellite. For example, if the second satellite transmits at a faster rate than the first satellite, then if the vehicle fails to receive a portion of the data from the first satellite (e.g., because it was being transmitted as the vehicle lost contact with the first satellite), then by the time the vehicle establishes communication with the second satellite, the vehicle may have "missed" the transmission of that portion of the data because it may already have been transmitted by the second satellite.

Keeping satellite transmissions relatively synchronized may be accomplished in any of numerous ways. In some embodiments of the invention, the satellites' transmissions may be kept relatively synchronized by controlling the rate at which teleports provide data to the satellites, so that data is provided to each satellite for re-transmission at about the same rate. As such, teleports 215A-215D (FIG. 2) may each provide the same data to corresponding satellites 220A-220D at about the same time. The rate at which data is provided to satellites for re-transmission may be fixed or variable, and may be established in any suitable fashion. For example, the rate may be defined by analyzing the rate at which each satellite transmits "other" data (i.e., data which does not constitute programming content), and establishing the rate so as to not consume the entirety of the excess bandwidth of any one satellite. Any of numerous other techniques may also, or alternatively, be used.

Figure 3:
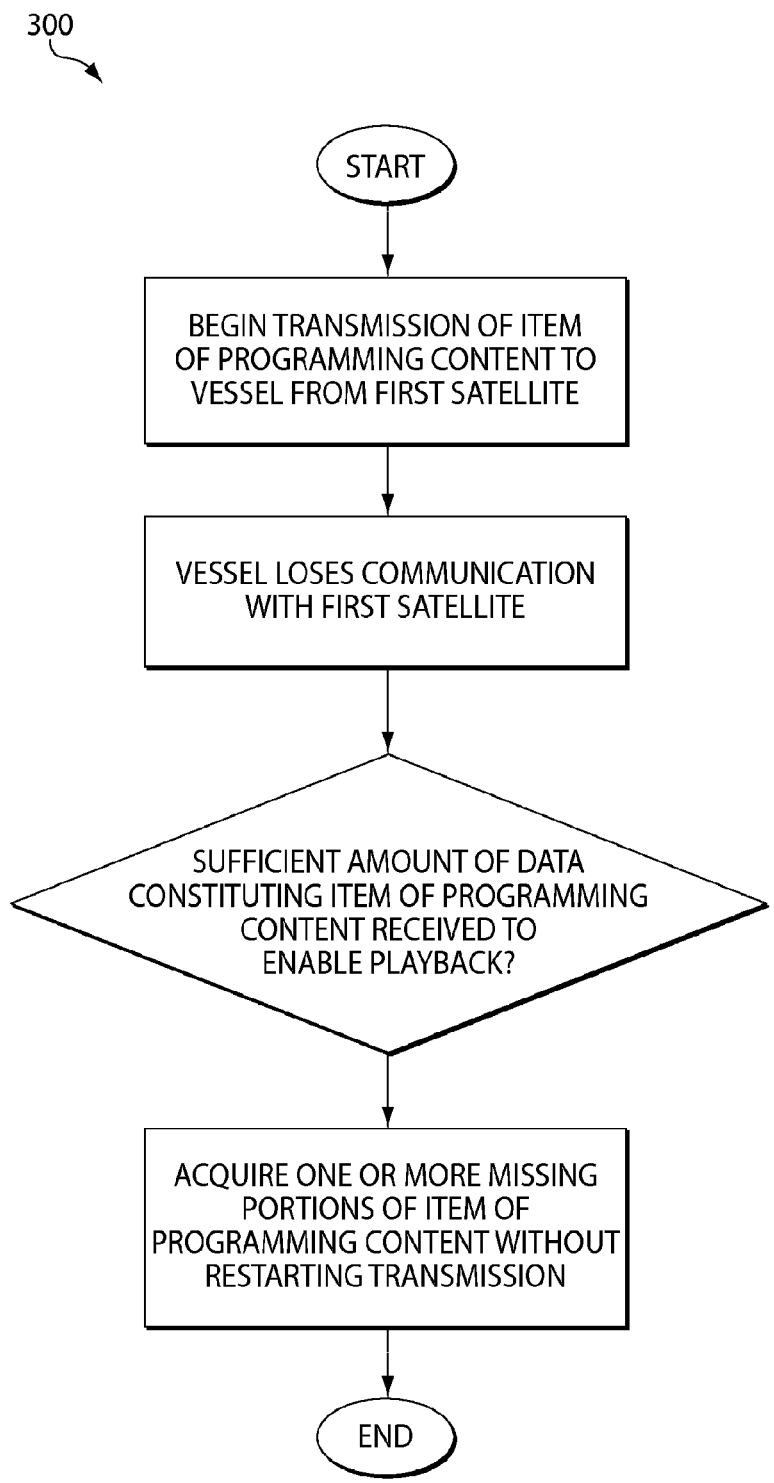
FIG. 3 is a flowchart depicting a representative process whereby a vehicle may transition from receiving an item of programming content from one satellite to receiving the item of programming content from another satellite, in accordance with some embodiments of the invention.

The Applicant has appreciated that even if all satellite transmissions are kept relatively synchronized, the possibility exists that a vehicle receiving the data that constitutes a particular item of programming content from one satellite will transition to a second satellite (e.g., after losing communication with the first satellite), and not receive a portion of the item from either the first satellite or the second satellite, so that the item cannot be played back on the vehicle. Accordingly, some embodiments of the invention provide techniques whereby a vehicle may acquire one or more missing portions of an item without the entirety of the item of programming content having to be retransmitted. FIG. 3 depicts a representative process 300 for doing this.

At the start of representative process 300, in act 310, a transmission of data constituting a unitary item of programming content is begun by a first satellite to a vehicle. For example, a teleport (e.g., one of teleports 215A-215D, FIG. 2) may provide data constituting an item of content to a first satellite, and instruct the first satellite to transmit the data, causing the satellite to transmit to a region where the vehicle is located.

Process 310 then proceeds to act 320, wherein the vehicle loses communication with the first satellite prior to the transmission being completed. This may happen for any of numerous reasons. For example, the vehicle may lose contact with the first satellite because it travels outside of an area serviced by the first satellite. The vehicle may, for example, seek to establish communication with the second satellite.

Process 300 then proceeds to act 330, wherein a determination is made whether enough of the data constituting the item of programming content was received to enable the item of programming content to be played back. This determination may be made in any of numerous ways. In some embodiments, programmed instructions may be executed to analyze the data. These instructions may be executed by one or more components resident on the vehicle (e.g., by client server 230) and/or residing in any other suitable location(s).

Any of numerous criteria may be used to determine whether a sufficient portion of an item has been received to enable playback. In one example, programmed instructions may be executed to analyze received data to determine whether the entire item has been received. In another example, programmed instructions may be executed to apply one or more error detection schemes (e.g., using a checksum, cyclic redundancy check, hash function, and/or other suitable error detection algorithm(s), whether now known or later developed) to determine whether enough data has been received to allow the item to be played back. This may involve analyzing individual segments (e.g., blocks of data) to determine whether enough data has been received so as to enable playback.

If it is determined in the act 330 that not enough data has been received to allow the item to be played back, then representative process proceeds to act 340, wherein one or more missing portions of the item are acquired by the vehicle. This may be performed in any of numerous ways. For example, programmed instructions may be executed to acquire one or more missing portions of the item. Missing portions may be acquired in any of numerous ways. For example, in some embodiments, missing portions may be generated from other data successfully received by the vehicle. In this respect, in some embodiments of the invention, a file that constitutes an item of programming content may include redundant data which may be used to generate one or more missing portions via an error correction algorithm. Any suitable error correction algorithm(s) may be used, whether now known or later developed. For example, some embodiments may employ one or more forward error correction (FEC) algorithm(s) to regenerate one or more missing portions of a file using redundant data provided in the file.

In some embodiments, one or more missing portions of an item may be acquired by requesting re-transmission of the portion(s). This may be performed instead of, or in addition to, generating any missing portions using redundant data. For example, in some embodiments, a vehicle may first attempt to generate missing portions using received data, and then request re-transmission if this effort fails. In other embodiments, re-transmission may be requested in parallel with a regeneration attempt. Any suitable approach may be employed.

A vehicle may request re-transmission of data in any of numerous ways. In some embodiments of the invention, each individual portion of an item of programming content (e.g., each block, packet, and/or any other suitable subdivision of the data constituting an item) may be assigned a unique identifier, and this identifier may be used to identify the portions that are to be re-transmitted. For example, a vehicle may include the identifier(s) for the missing portions in a request sent via satellite 220 and corresponding teleport 215 to enterprise server 310. Enterprise server 310 may respond to the request by retrieving the missing portion(s) from storage (e.g., based on the identifier for each portion) and include the portion(s) in a subsequent transmission sent via one or more of teleports 215A-215D and satellites 220A-220D. For example, in some embodiments, the portions may be included in one or more "catch-up" multicast transmissions, which may be sent via the specific teleport and satellite combination that services the area in which the vehicle is located, via all teleports and satellites to all terminals, and/or in any other suitable fashion. Of course, the invention is not limited to sending one or more missing portions via transmissions which may be received by multiple vehicles. For example, missing portions may be sent via a point-to-point transmission. Any suitable technique(s) may be employed.

At the completion of the act 340, or if it is determined in the act 330 that a sufficient amount of the item of programming content was received to enable the item to be played back on the vehicle, representative process 300 completes.

It should be appreciated that there may be numerous reasons why a vehicle seeks to acquire one or more missing portions of an item, and so representative process 300 need not be performed in relation to a vehicle transitioning from one satellite to another. For example, a vehicle may not properly receive the data constituting an item of programming content because of weather conditions at the vehicle's location, technical failure by a satellite, blockage of a satellite's transmission (e.g., due to a vehicle's proximity to a hill, bridge, etc.) and/or any of numerous other reasons. Representative process 300 may be performed to assist a vehicle in dealing with any or all of these issues.

It should also be appreciated that although the description of process 300 above relates to the specific example of a vehicle transitioning from one satellite to another, the process may be performed in relation to a vehicle transitioning between any suitable number of satellites (e.g., three or more).

While some embodiments of the invention may seek to minimize the amount of data that is re-transmitted to vehicles by keeping satellite transmissions relatively synchronized, some other embodiments may provide data to satellites at varying rates. This may be for any of numerous reasons. One reason may be to optimize the amount of data that is transmitted to vehicles. In this respect, it should be appreciated that each satellite shown in FIG. 2 may be committed to transmitting a different amount of "other" data (i.e., non-programming content) at any one time, and may therefore have excess transmission capacity which varies over time. In some embodiments of the invention, the amount of data constituting programming content that is provided to each individual satellite may be dynamically throttled based upon that satellite's excess transmission capacity, so as to opportunistically exploit the excess capacity as it becomes available, and optimize the amount of programming content that may be sent to vehicles.

Additionally or alternatively, some embodiments of the invention may provide techniques for balancing transmissions among multiple modulation encodings on a single satellite beam. Data may be transmitted on more than one modulation encoding, for example, to enable different types of data to be transmitted from different "locations" (i.e., data rates) on the same beam, and/or to direct particular types of transmissions to particular types of antennas. In this respect, data which is sent on "lower" encodings (i.e., at relatively lower data rates) is generally transmitted more reliably, and can be received across a wider area by more types of vehicle antennas in a greater range of weather conditions. By contrast, transmissions on "higher" encodings are sent faster, but may not be received properly in all areas, and/or may not be received by all types of antennas. As such, if two modulation encodings on a beam are used to transmit two different types of data, with one data type being more critical than the other, then the more critical data type is typically sent on the lower modulation encoding, so that it may be more reliably received.

Data sent on any modulation encoding could consume the entirety of a satellite's beam if transmitted at the maximum rate afforded by the encoding. For example, if data were transmitted at two different modulation encodings, including a first which affords a 2 Mbit/s data rate, and a second which affords a 10 Mbit/s data rate, then if data were transmitted on the first modulation encoding at the full 2 Mbit/s data rate, it would consume the total bandwidth afforded by the beam. Conversely, if data were transmitted on the second modulation encoding at the full 10 Mbit/s data rate, then the transmission would consume the beam's total bandwidth. As a result, some embodiments of the invention seek to balance the amount of data transmitted by the satellite on each of multiple modulation encodings, to optimize the amount of programming content that may be sent to vehicles while also managing the transmission rate versus reliability tradeoff described above.

Figure 4:
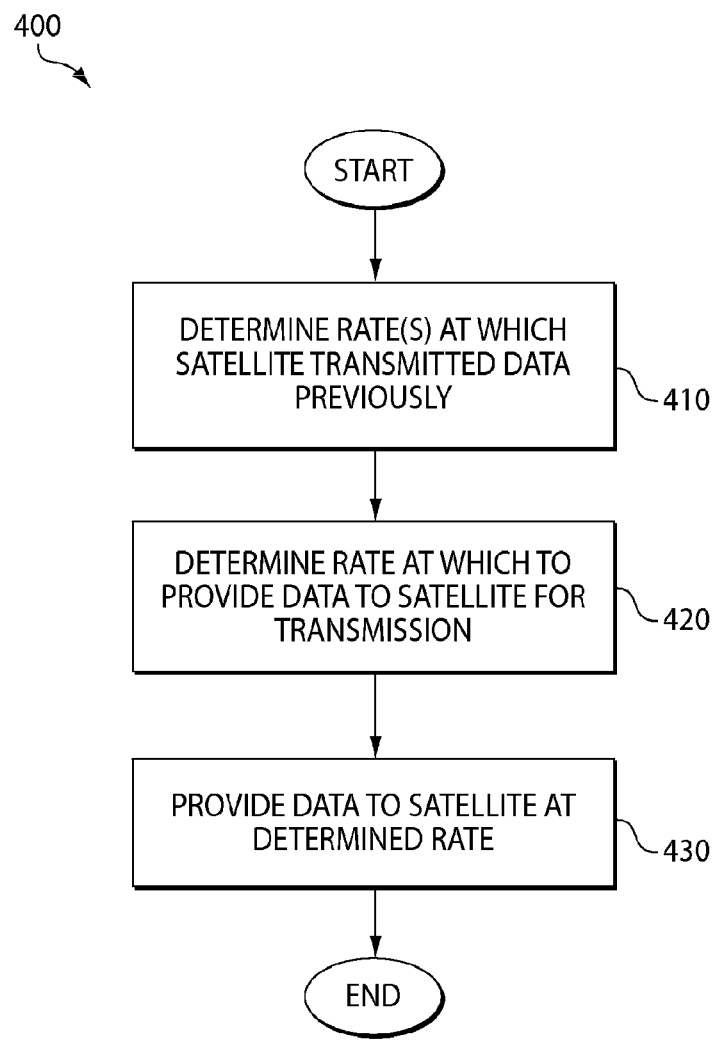
FIG. 4 is a flowchart depicting a representative process whereby a teleport may provide data to a corresponding satellite for transmission to vehicles, in accordance with some embodiments of the invention.

A representative process 400 for providing data to a satellite for transmission on multiple modulation encodings is shown in FIG. 4. Representative process 400 may, for example, be performed by one of teleports 215A-215D (FIG. 2) in providing data to a corresponding satellite. Representative process 400 assumes that data is transmitted by the satellite on two different modulation encodings. It should be appreciated, however, that variations on this process may enable data to be transmitted on any suitable number of different modulation encodings, as embodiments of the invention are not limited in this respect.

At the start of representative process 400, in act 410, a teleport acquires information relating to the rate at which a satellite previously transmitted data at each modulation encoding. This information may take any of numerous forms, and may be acquired in any of numerous ways. In some embodiments of the invention, a teleport which provides data to a satellite may query the satellite to acquire information relating to the satellite's transmissions at each modulation encoding during one or more previous time periods. Of course, the invention is not limited to a teleport acquiring this information by querying a corresponding satellite. The information may be obtained by any suitable entity or entities, from any suitable source(s) (e.g., one or more terminals that received data transmitted by the satellite, and/or one or more other sources), in any suitable way(s).

In some embodiments, the information that is acquired in the act 410 includes a rate at which the satellite transmitted data on each modulation encoding at selected intervals over the previous time period(s). Any suitable interval(s), over any suitable time period(s), may be used. In some embodiments of the invention, transmission rate data is collected for four minute intervals occurring over a thirty minute period.

Other information may also be acquired in the act 410. For example, in some embodiments, the teleport may acquire information including a maximum rate at which data may be transmitted on each modulation encoding, and/or a maximum rate at which data constituting programming content may be transmitted on each modulation encoding. In other embodiments, one or more of these pieces of information may be predetermined. The information may be made available in any suitable fashion.

Figure 5:
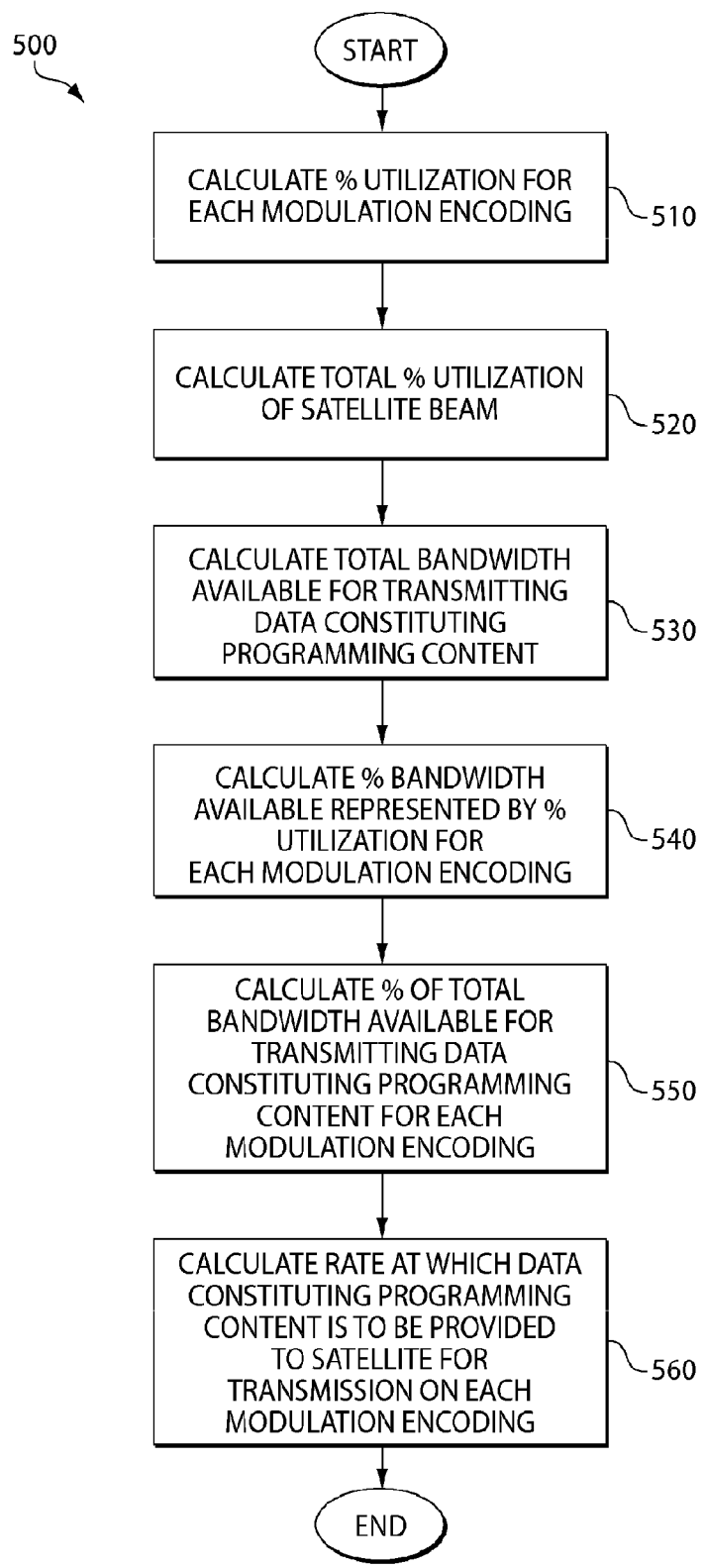
FIG. 5 is a flowchart depicting a representative process whereby a teleport may determine a rate at which to provide data to a satellite for transmission, in accordance with some embodiments of the invention.

Representative process 400 then proceeds to act 420, wherein the teleport determines a rate at which to provide data constituting programming content to the satellite going forward on each modulation encoding. A representative process 500 for making this determination is shown in FIG. 5.

At the start of representative process 500, in act 510, the percentage utilization for each modulation encoding (i.e., "channel-speed-percent") is calculated using formula (1):

$$\text{channel-speed-percent} = \text{channel-speed-mbit}/\text{channel-speed-max-mbit}, \quad (1)$$

where channel-speed-mbit equals the bandwidth used on the modulation encoding, and channel-speed-max-mbit equals the maximum possible data rate for the modulation encoding.

Process 500 then proceeds to act 520, wherein the total percent utilization of the satellite beam (i.e., "total-speed-percent") is calculated using formula (2):

$$\text{total-speed-percent} = \text{sum of channel-speed-percent for all modulation encodings.} \quad (2)$$

The process then proceeds to act 530, wherein the total bandwidth available for transmitting data constituting programming content (i.e., "channel-speed-mcast-total-mbit") is calculated using formula (3):

$$\text{channel-speed-mcast-total-mbit} = \text{sum of channel-speed-max-mcast-mbit for all modulation encodings}, \quad (3)$$

where channel-speed-max-mcast-mbit is a maximum rate at which data constituting programming content may be transmitted on a modulation encoding. As noted above, this information may be acquired from the satellite, or established a priori.

At the completion of act 530, representative process 500 then proceeds to act 540, wherein the percentage of the bandwidth available for transmitting data constituting programming content (i.e., "channel-speed-mcast-total-mbit") that is represented by the percentage utilization for each modulation encoding (i.e., "channel-speed-percent") is calculated. This percentage (i.e., "channel-speed-mcast-percent") is calculated using formula (4):

$$\text{channel-speed-mcast-percent} = \text{channel-speed-percent}/\text{channel-speed-mcast-total-mbit}, \quad (4)$$

where channel-speed-max-mcast-mbit is calculated using formula (3) and channel-speed-percent is calculated using formula (1).

Representative process 500 then proceeds to act 550, wherein the percentage of the total bandwidth available for transmitting data constituting programming content for each modulation encoding (i.e., "channel-speed-max-mcast-percent") is calculated using formula (5):

$$\text{channel-speed-max-mcast-percent} = \text{total-speed-percent} \times \text{channel-speed-mcast-percent}, \quad (5)$$

where total-speed-percent is calculated using formula (2) and channel-speed-mcast-percent is calculated using formula (4).

At the completion of act 550, the process then proceeds to act 560, wherein the rate at which data constituting programming content is to be provided to the satellite for transmission on each modulation encoding (i.e., "channel-speed-mcast") is calculated using formula (6):

$$\text{channel-speed-mcast} = \text{channel-speed-max-mbit} \times \text{channel-speed-max-mcast-percent}, \quad (6)$$

where channel-speed-max-mbit equals the maximum possible data rate for the modulation encoding, and channel-speed-max-mcast-percent is calculated using formula (5). At the completion of act 560, representative process 500 completes.

It should be appreciated that process 500 represents merely one of many techniques which may be used to determine a rate at which data is to be provided to a satellite. Any suitable technique, or combination of techniques, may alternatively be used.

Referring again to FIG. 4, at the completion of act 420, representative process 400 proceeds to act 430, wherein data is provided by the teleport to the satellite at the rate determined in the act 420 for each modulation encoding. Representative process 400 then completes.

It should also be appreciated that numerous variations on the processes described above with reference to FIGS. 4 and 5 are possible, and that different variations may be used to support the achievement of any of numerous objectives. For example, in some variations, a teleport may dynamically shift between the modulation encodings on which data constituting programming content is sent to the satellite, so as to balance the risk of the data not being reliably received by vehicles against a desire to send the data at the fastest possible transmission rate. This shifting may be based, for example, upon information indicating weather conditions in an area serviced by the satellite, the satellite's success in transmitting data, and/or other information.

A satellite's success in transmitting data may be determined in any suitable way. In some embodiments of the invention, a feedback loop may be established to provide this information. Representative feedback loop 600, shown in FIG. 6, includes a number of the components described above with reference to FIG. 2, as well as a dedicated "receive site" for receiving transmissions from a corresponding satellite. The receive site may provide information on whether certain satellite transmissions have been successfully received. This information may be analyzed to determine how subsequent transmissions should be performed. As one example, if a receive site reports a high rate of failure in receiving transmissions from a satellite, and other information indicates that weather issues may be affecting the area to which the satellite transmits, then subsequent transmissions may be sent at one or more lower modulation encodings, to increase transmission reliability. If the receive site later begins to report a greater rate of success in receiving data, then subsequent transmissions may be sent at one or more higher modulation encodings, so as to increase the amount of data that may be transmitted. Any of numerous actions may be taken in response to analyzing data provided by one or more receive sites.

Representative feedback loop 600 involves communication of data between components which include enterprise server 210, a teleport 215, a satellite 220 in communication with the teleport, and a receive site 605. Receive site 605 may comprise any collection of components suitably configured to receive transmissions from satellite 220 (e.g., an antenna suitably configured to receive transmissions from satellite 220 and a modem suitably configured to demodulate the transmissions) and to supply information relating to those transmissions to other components shown in FIG. 6. In some embodiments of the invention, receive site 605 may be land-based, although the invention is not limited to such an implementation. For example, receive site 605 may be located at sea, be airborne, or reside in any other suitable location(s). In embodiments in which satellite 220 sends directional transmissions to a particular geographic area, receive site 605 may be located within that area, although the invention is not limited to either employing directional transmissions or to having receive site 605 be located within any particular area.

At the start of feedback loop 600, enterprise server 210 provides a test file to teleport 215, as indicated at 610. A test file may take any suitable form, include any suitable information, and be transmitted to teleport 215 in any suitable fashion. For example, a test file may be sent by enterprise server to teleport 215 via network(s) 212, shown in FIG. 2.

Teleport 215 then provides the test file, or a derivation thereof, to satellite 220, as indicated at 615. This may be performed in any suitable fashion. For example, teleport 215 may employ the same communications infrastructure and/or techniques as those described above in relation to providing data constituting programming content to a satellite to send the test file to satellite 220. The test file may be included within a data set that also includes programming content, may be sent separately from data constituting programming content, or provided in some other way(s). Any suitable technique(s) may be employed.

Satellite 220 then sends the test file to receive site 605, as indicated at 620. As with the transmission from teleport 215 to satellite 220 in the previous step, a transmission from satellite 220 to receive site 605 may employ the same communications infrastructure and/or techniques as those described above in relation to transmitting programming content for receipt by a vehicle. The test file may be included within data comprising programming content, sent separately from such data, or be sent in some other way(s).

After receiving the test file, or after a predetermined amount of time passes after the test file is sent, receive site 605 provides an indication of the data it has received to teleport 215, as indicated at 625. The indication may take any of numerous forms. For example, it may indicate that the test file was successfully received in its entirety, was received in altered (e.g., corrupted) form, was not received, and/or provide other information.

Enterprise server 210 then queries teleport 215 to acquire information provided in the indication, as indicated at 630. A query may take any of numerous forms, and be sent in any of numerous ways. For example, a query may be transmitted via network(s) 212, shown in FIG. 2.

Teleport 215 then responds to the query, as indicated at 635. A response may include any suitable information. For example, a response may indicate whether one or more test files were received, whether issues were encountered with any received test file, and/or other information. This information may provide an indication of how successfully satellite 220 transmits data to vehicles, and may enable any of numerous types of remediation to be performed if transmission issues are indicated, such as altering the manner in which (e.g., the modulation encoding(s) at which) data is subsequently transmitted by the satellite, suspending transmissions for a certain time period, and/or taking other actions.

Figure 6:
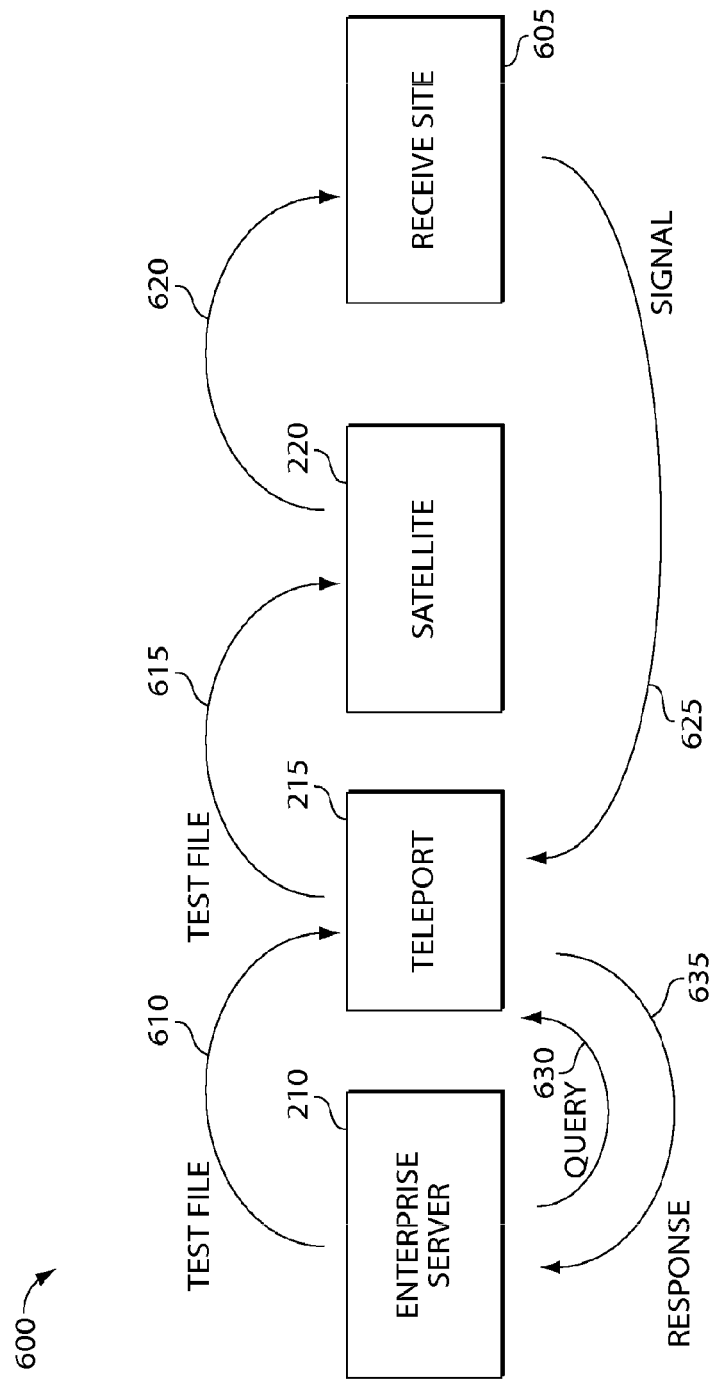
FIG. 6 is a block diagram depicting a representative feedback loop providing an indication of a satellite's success in transmitting data to vehicles, in accordance with some embodiments of the invention.

It should be appreciated that although FIG. 6 shows only a single test file being sent to, and being reported on by, receive site 605, multiple test files and/or other types of information may be sent and reported on. For example, test files may be sent over a period of time, and the response to a query provided by teleport 215 indicated at 635 may provide information on transmissions during that period.

It should also be appreciated that a feedback loop may be established for more than one satellite. For example, one or more receive sites may be installed for each of multiple satellites, and provide information that may be useful in diagnosing issues affecting multiple satellites (e.g., system-wide issues). For example, information provided by multiple receive sites may be useful in ascertaining a system's overall "health," identifying issues with the manner in which all teleports provide data to satellites, and/or other conditions.

It should further be appreciated that although the two transmission approaches described above (i.e., a first approach whereby satellite transmissions are kept relatively synchronized to minimize data re-transmissions, and a second approach whereby satellite transmissions are dynamically throttled to optimize the amount of data that may be delivered to vehicles) support competing objectives, they need not be mutually exclusive. For example, some embodiments of the invention may employ one approach for a period, and then switch to another approach in response to one or more stimuli (e.g., the passage of a certain period of time, one or more criteria being satisfied, etc.). Some embodiments may vary the approach used according to the type of data to be transmitted (e.g., one approach could be used for a first data type, and another approach may be used for another data type), according to satellite (e.g., one approach could be used to transmit from one or more first satellites, and another could be used for one or more other satellites), etc. Any suitable transmission technique(s) may be employed, as embodiments of the invention are not limited in this respect.

The Applicant has recognized that delivery of programming content via a "trickle feed" means that it may be difficult to determine beforehand when a particular item of content will be available for playback on a particular vehicle. That is, even though the amount of data that constitutes an item of programming content and the rate at which the data will be transmitted may be known, any of numerous issues may affect a vehicle's ability to receive it. This is in contrast to conventional mass content distribution schemes, wherein a distributor (e.g., a cable operator, satellite operator, etc.) knows exactly when a content provider (e.g., a broadcast network) will make a particular item of content available via a continuous stream sent by the content provider. This enables the distributor to make an electronic program guide (EPG) available to consumers, indicating when an item of content will be available for playback on terminal devices.

Some embodiments of the invention provide techniques for defining a manner (e.g., a time, a sequence, etc.) in which one or more items of content received by a vehicle will be made available to viewers on the vehicle. As such, an EPG may be constructed to indicate to the vehicle's passengers and/or crew when the item(s) will be available.

As the time at which an item of content will be received by a vehicle is difficult to determine in advance, in some embodiments, the manner in which one or more items of content are made accessible to the vehicle's passengers and/or crew may be defined at least in part on when the item(s) is(are) received in a condition that enables playback. Other considerations may also influence the manner in which one or more items are made available for playback. For example, in some embodiments, characteristics of each item may influence the manner in which the item(s) are made available. As one example, the date of an item's creation may influence how and/or when it is made available, such as if a goal is to make available the most recently created content as soon as possible.

In some embodiments, the manner in which content is made available may be premised, at least in part, on passengers and/or crew having continuous access to content. As such, in some embodiments of the invention, items of content may be played back in a continuous loop, so that there are no "dead spots" during which no content is played back.

Figure 7:
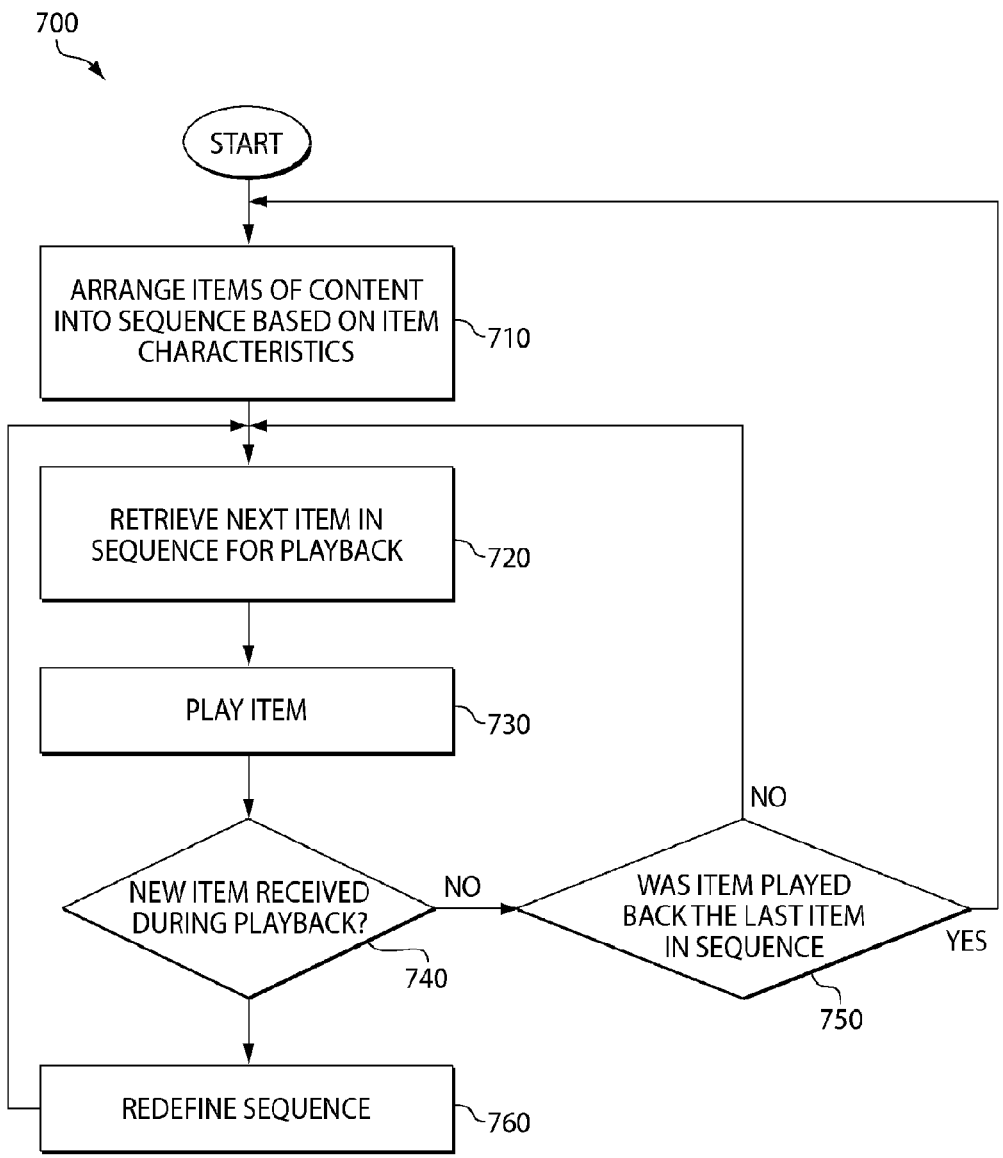
FIG. 7 is a flowchart depicting a representative process whereby items of content received by a vehicle may be arranged into a playback sequence, in accordance with some embodiments of the invention.

A representative process 700 for defining a manner in which items of content received by a vehicle are played back is shown in FIG. 7. Specifically, representative process 700 may be performed to define an initial sequence in which items received by the vehicle are to be played back, and then to redefine the sequence if and/or when new items of content are received. As a result, an EPG may be defined to inform users when each item of content will be available for playback.

At the start of representative process 700, items of content which have been received by the vehicle are arranged into a playback sequence based upon one or more characteristics of the items in act 710. This may be performed in any of numerous ways. One illustrative technique is described below with reference to FIG. 8.

Figure 8:
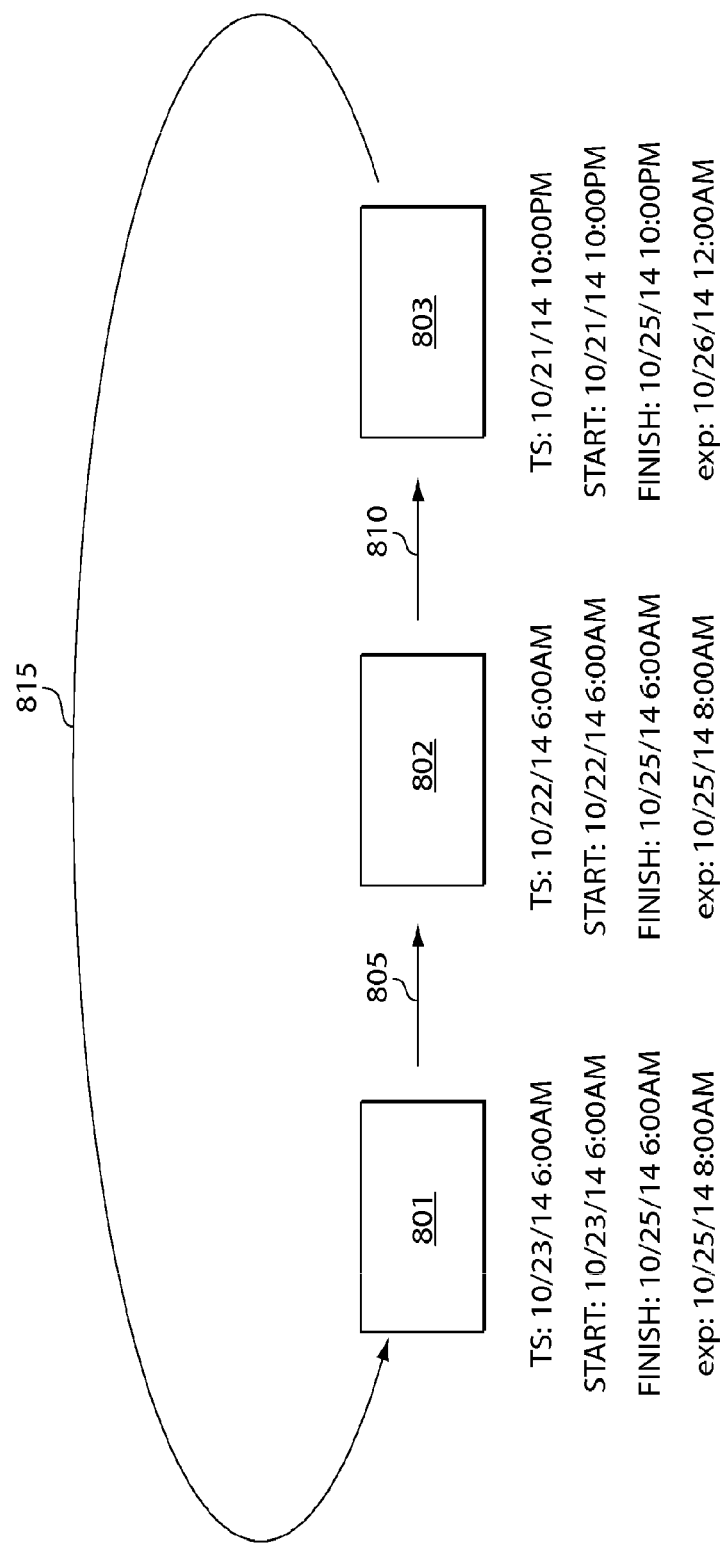
FIG. 8 is a block diagram which illustrates a representative technique for arranging items of content into a playback sequence, in accordance with some embodiments of the invention.

In FIG. 8, three items of content 801, 802 and 803 are shown. Each item has characteristics reflected in FIG. 8. These characteristics may, for example, be defined via metadata that is transmitted as part of the item to the vehicle. In the example shown, each item's characteristics include a time stamp (TS) which indicates when the item was created, a playback start time (START) indicating the earliest time that playback of the item may be started, a playback finish time (FINISH) indicating the latest time that playback of the item may be started, and an expiration time (EXP.) indicating when the item has expired and is to be deleted from the vehicle's onboard server. Of course, an item of programming content may have any suitable characteristics, which may be defined in any suitable way(s).

It can be seen that, in the example of FIG. 8, item 801 was created on 10/23/14 at 6:00 a.m., and has a start time of 10/23/14 at 6:00 a.m., a finish time of 10/25/14 at 6:00 a.m., and an expiration of 10/25/14 at 8:00 a.m. Item 802 was created on 10/22/14 at 6:00 a.m., and has a start time of 10/22/14 at 6:00 a.m., a finish time of 10/25/14 at 6:00 a.m., and an expiration of 10/25/14 at 8:00 a.m. Item 803 was created on 10/21/14 at 6:00 a.m., and has a start time of 10/21/14 at 6:00 a.m., a finish time of 10/25/14 at 10:00 p.m., and an expiration of 10/26/14 at 12:00 a.m.

In the example which is illustrated in FIG. 8, act 710 involves arranging items 801, 802 and 803 into a sequence based upon each item's time of creation, with items created most recently being placed before items created later in the sequence. Act 710 also involves omitting an item from the sequence if its start time has not yet arrived, or if its finish and/or expiration time has arrived. It should be appreciated, however, items of content may be arranged into a sequence to achieve any of numerous objectives. Thus, the example shown in FIG. 8 is provided for illustration purposes only.

In this example, assume that act 710 is performed on 10/24/14 at 8:00 a.m., and that each of items 801, 802 and 803 takes about 20 minutes to play back.

Because the time stamps of items 801, 802 and 803 indicate that item 801 was created most recently (i.e., on 10/23/14 at 6:00 a.m.), followed by item 802 (i.e., created on 10/22/14 at 6:00 a.m.), and then item 803 (i.e., created on 10/21/14 at 10:00 p.m.), the items are arranged in this sequence in act 710. None of the items are omitted from the sequence, as the start time for each item (i.e., 10/23/14 at 6:00 a.m. for item 801, 10/22/14 at 6:00 a.m. for item 802, and 10/21/14 at 10:00 p.m. for item 803) has already arrived, and the finish time (i.e., 10/25/14 at 6:00 a.m. for item 801, 10/25/14 at 6:00 a.m. for item 802, and 10/25/14 at 10:00 p.m. for item 803) and expiration time (i.e., 10/25/14 at 8:00 a.m. for item 801, 10/25/14 at 8:00 a.m. for item 802, and 10/26/14 at 12:00 a.m. for item 803) for the items have not yet arrived. According to the sequence shown in FIG. 8, item 801 is to be played back first, then item 802 (as indicated by arrow 805), then item 803 (as indicated by arrow 810). Arrow 815 indicates that when playback of item 803 completes, item 801 is to be played next, so that the playback sequence shown in FIG. 8 is to loop continuously.

Returning to FIG. 7, upon completion of the act 710, representative process proceeds to act 720, wherein the next item in the sequence is retrieved for playback. In the example sequence shown in FIG. 8, item 801 is the next item in the sequence, and so it is retrieved (e.g., from the vehicle's onboard server) for playback. Item 801 is then played back in act 730.

At the completion of playback, representative process 700 proceeds to act 740, wherein a determination is made whether any new items of content were received during playback. If it is determined that no new items of content were received, then process 700 proceeds to act 750, wherein a determination is made whether the item played back in the act 730 was the last item in the sequence defined in the act 710. If not, process 700 returns to act 720, wherein the next item in the sequence is retrieved for playback, and if so, process 700 returns to act 710, wherein items of content are arranged into sequence for playback as described above. In the example shown in FIG. 8, since item 801 is not the last item in the sequence, process 700 returns to act 720, wherein item 802 (i.e., the next item in the sequence of FIG. 8) is retrieved. Process 700 then proceeds as described above. It can be seen, then, that if no new items of content are received by the vehicle during playback of items 801, 802 and 803, these items will be played back in a continuous loop.

However, if it is determined in the act 740 that a new item was received during playback of an item in the act 730, then representative process 700 proceeds to act 760, wherein the sequence initially defined in the act 710 is redefined. An example is shown in FIG. 9.

Figure 9:
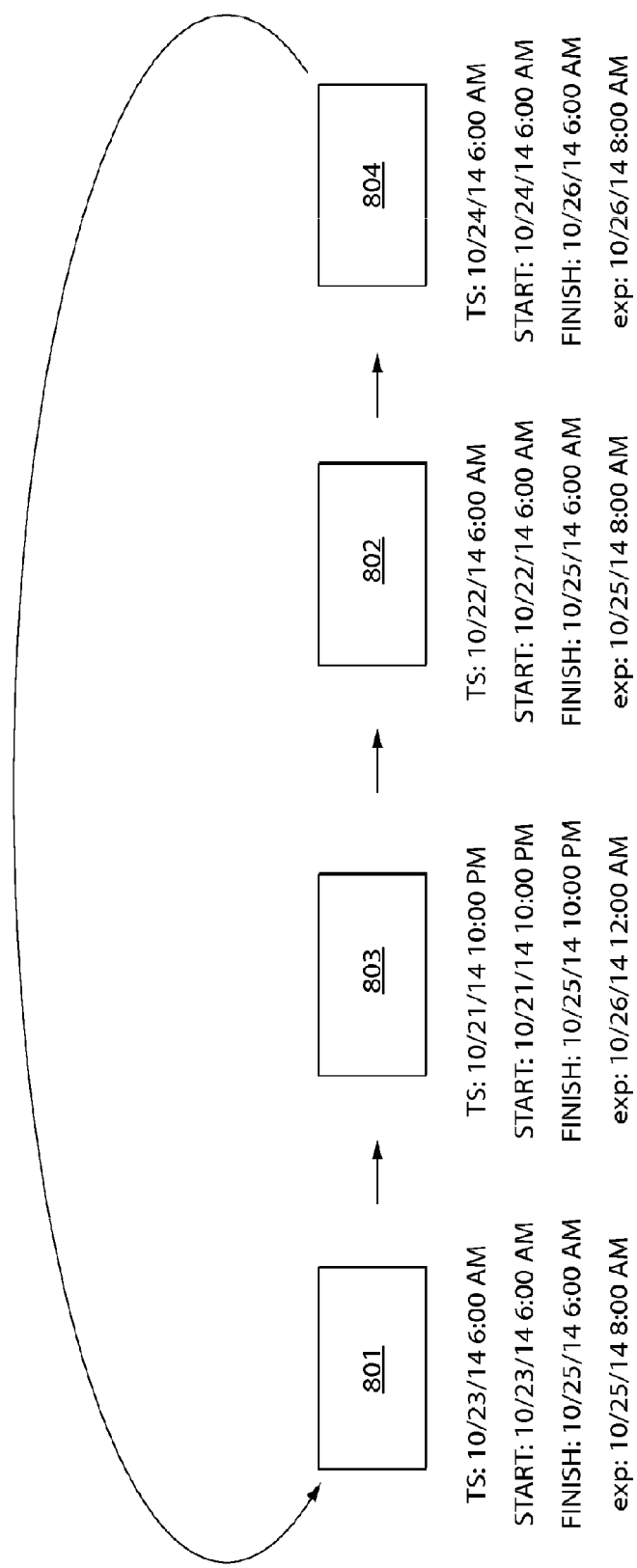
FIG. 9 is a block diagram which illustrates a representative technique for arranging items of content into a sequence for playback, in accordance with some embodiments of the invention.

FIG. 9 depicts the items 801, 802 and 803 which are also shown in FIG. 8, and item 804. Assume that item 804 was received during playback of the item 801 in act 730. Like items 801, 802 and 803, item 804 has a time stamp, start time, finish time and expiration time. It can be seen that item 804 was created on 10/24/14 at 6:00 a.m., has a start time of 10/24/14 at 6:00 a.m., a finish time of 10/26/14 at 6:00 a.m., and an expiration time of 10/26/14 at 8:00 a.m. As such, item 804 was created more recently than item 802 (which was created on 10/22/14 at 6:00 a.m.) and item 803 (which was created on 10/21/14 at 10:00 p.m.).

It can also be seen that the start time for each of items 802, 803 and 804 has arrived, and the finish time and expiration time for these items have not arrived. In this respect, because process 700 began on 10/24/14 at 8:00 a.m. and item 801 took about twenty minutes to play back, the start time for each item (i.e., 10/24/14 at 6:00 a.m. for item 804, 10/22/14 at 6:00 a.m. for item 802, and 10/21/14 at 10:00 p.m. for item 803) has already arrived, and the finish time for each item (i.e., 10/26/14 at 6:00 a.m. for item 801, 10/25/14 at 6:00 a.m. for item 802, and 10/25/14 at 10:00 p.m. for item 803) and expiration time for each item (i.e., 10/26/14 at 8:00 a.m. for item 804, 10/25/14 at 8:00 a.m. for item 802, and 10/26/14 at 12:00 a.m. for item 803) has not yet arrived.

In the example shown in FIG. 9, items 802, 803 and 804 are arranged into sequence by timestamp, with items having an earlier timestamp being placed earlier in the sequence than items having a later timestamp. Because item 803 has an earlier timestamp than item 802, and item 802 has an earlier timestamp than item 804, and each of these items have start times which have already arrived and finish and expiration times which have not yet arrived, in act 760 the sequence is redefined so that item 803 is played next, followed by items 802 and 804. It should be appreciated, however, that (as with the procedure described above with reference to FIG. 8) items of content may be arranged into a sequence using any suitable technique, to achieve any of numerous objectives, and the example shown in FIG. 9 is provided for illustration purposes only. For example, the technique described with reference to FIG. 9 could be modified so that the most recently created content is played back first in a sequence, such that act 760 may involve arranging items 802, 803 and 804 in a sequence so that item 804 is played back next, followed by items 802 and 803.

At the completion of act 760, representative process 700 returns to act 720, wherein the next item in the sequence is retrieved for playback. In the example of FIG. 9, the next item in the sequence is item 802, and so it is retrieved for playback, and then played back in the act 730. Process 700 then proceeds in the manner described above. As such, it can be seen that items of content are played back in a continuous loop unless new items of content are received. If a new item is received, it is inserted into the sequence based upon its time of creation, so long as its start time has arrived. An item is removed from the sequence if its finish and/or expiration time has arrived.

As noted above, the techniques illustrated in FIGS. 8 and 9 may be performed to make content available as it is received by a vehicle. Of course, other techniques may be used, and/or the techniques described above may be modified, to achieve other objectives. As one example, the techniques described above may be modified to limit the number of items in a sequence, so that (for example) no more than five items are played back in sequence before returning to the first item in the sequence. Any of numerous techniques may be used, as the invention is not limited to being used or implemented in any particular way.

Figure 10:
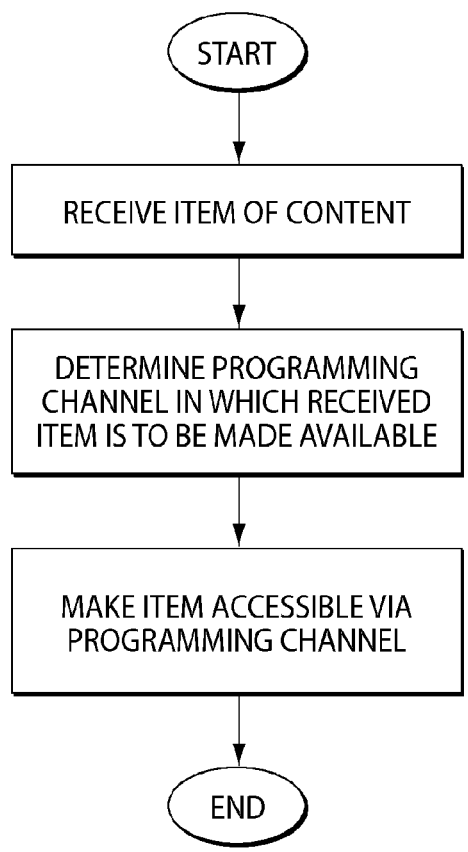
FIG. 10 is a flowchart depicting a representative process for dynamically defining the programming channels made available to viewers, in accordance with some embodiments of the invention.

While the process described above with reference to FIGS. 7-9 may be used to define the manner in which content for a particular programming "channel" is played back (e.g., by defining a sequence in which items of a particular type, such as news clips, sports programming, movies, etc. are played back), some embodiments of the invention may also provide techniques for dynamically assigning an item of content received by a vehicle to a particular channel based at least in part on its characteristics. FIG. 10 depicts a representative process 1000 for dynamically defining programming channels which are made available to viewers.

At the start of process 1000, a new item of content is received. In one example, an item may be received by a vehicle (e.g., vessel 222, shown in FIG. 2) and stored in its onboard server (e.g., onboard server 235). In another example, an item may be received by enterprise server 210, from staging server 205. Any suitable component(s) may receive an item of content in act 1010.

Process 1000 then proceeds to act 1020, wherein a programming channel through which the received item of content is to be made accessible is determined. This may be performed in any of numerous ways. In some embodiments of the invention, the programming channel may be determined based at least in part on the item's type. For example, the item may include, or have associated therewith, an indication of a type of programming content, and this indication may be used to determine the channel through which the item will be made accessible. For example, if the item's type indicates that the item is a news clip, or a movie, or a televised sports contest, then the item may be assigned to a channel which makes content items of that type available to viewers. Of course, an item of content need not be associated with a programming channel based on its type, as any of numerous types of information and/or considerations may influence the channel to which the item is assigned.

It should be appreciated that the programming channel to which an item is assigned need not be pre-existing. For example, a programming channel may be newly established to provide access to a type of programming content to which the item belongs. As an example, if the item is a sports movie, a number of other sports movies were previously received, and there is no pre-existing channel for showing sports movies, then a sports movie channel may be newly established in response to the item being received (e.g., based upon a "critical mass" of sports movies now being available for playback).

At the completion of act 1020, process 1000 proceeds to act 1030, wherein the item is made available via the programming channel determined in the act 1020. This may be performed in any of numerous ways. For example, the process described above with reference to FIG. 7 may be performed to define a sequence in which the item and, potentially, other items may be played back. Of course, any suitable technique(s) may alternatively be employed. Representative process 1000 then completes.

It should be appreciated that although many aspects of the foregoing description relate to distributing video content to vehicles, embodiments of the invention are not limited to distributing content of any particular type. For example, embodiments of the invention may be employed to distribute audio content (e.g., music, podcasts, news items, etc.), image content (e.g., graphics, charts, maps, etc.) documents, files, bodies of program instructions, and/or content and data of any other suitable type(s).

Figure 11:
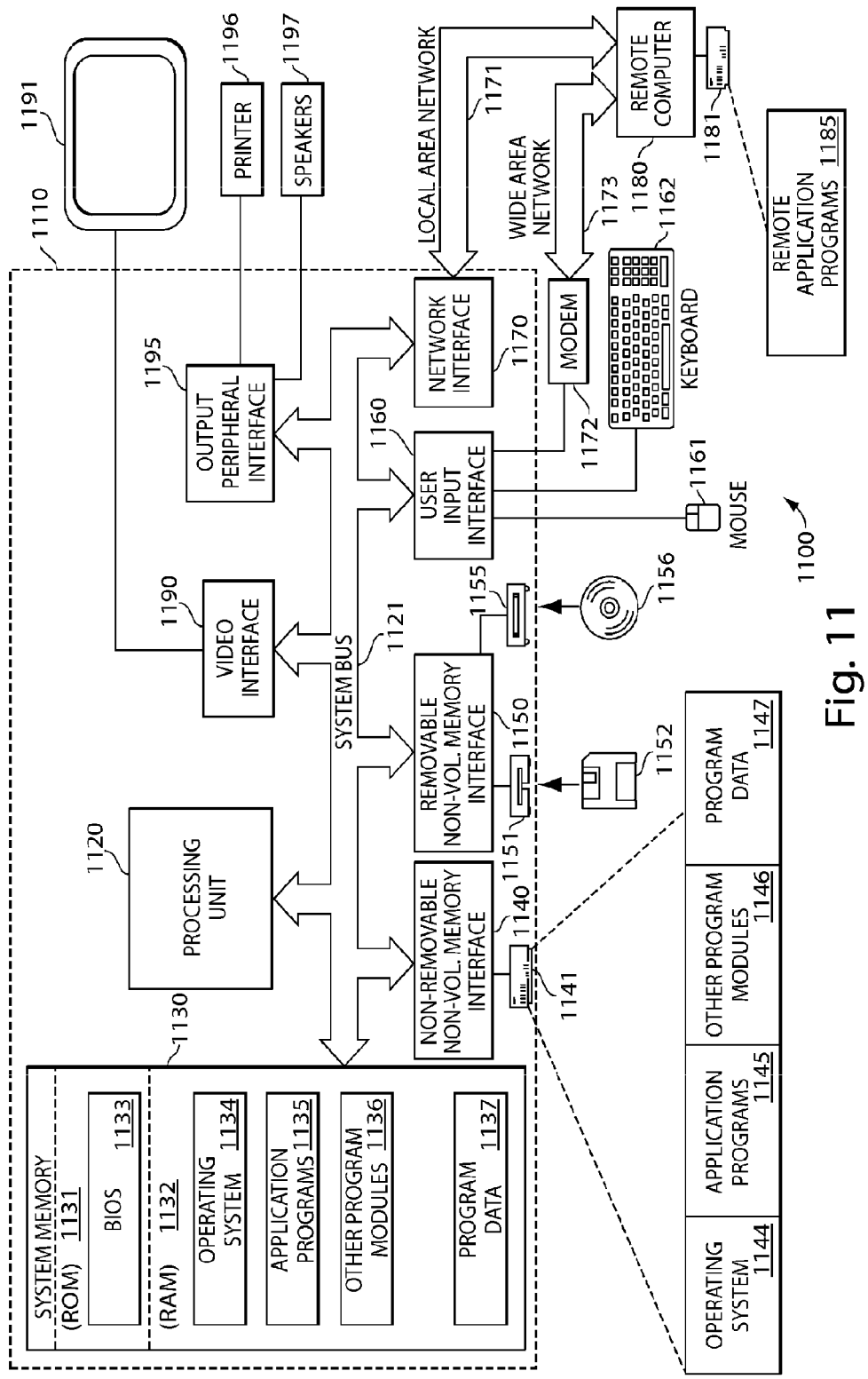
FIG. 11 is a block diagram depicting a representative computer system which may be used to implement some aspects of the invention.

Some aspects of the invention may be implemented using a computing system environment. FIG. 11 illustrates one example of a suitable computing system environment 1100 which may be used to implement certain aspects of the invention. The computing system environment 1100 is only one example of a suitable computing environment, and is not intended to suggest any limitation as to the scope of use or functionality of the invention. Neither should the computing environment 1100 be interpreted as having any dependency or requirement relating to any one or combination of components illustrated in the exemplary operating environment 1100. In this respect, the invention is operational with numerous other general purpose or special purpose computing system environments or configurations. Examples of well-known computing systems, environments, and/or configurations that may be suitable for use with the invention include, but are not limited to, personal computers, server computers, mobile or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 11 depicts a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 1110. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through an non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 536, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 560 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through a output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium, such as a transitory medium like a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been provided. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for delivering content for playback on a vessel, the system comprising:
    at least one teleport, in networked communication with at least one satellite having a transmission capacity which was at least partially consumed by data transmissions during at least one previous period, configured to provide a unitary item of programming content to the at least one satellite for transmission to a seagoing vessel and to instruct the at least one satellite to transmit the unitary item of programming content to the seagoing vessel in a manner which is determined based at least in part upon an extent to which the at least one satellite's transmission capacity was consumed during the at least one previous period; and
    at least one storage facility, configured for deployment on the vessel and to store the unitary item of programming content transmitted by the at least one satellite so as to make the unitary item of content available for playback on the vessel.

2. The system of claim 1, wherein the at least one teleport is configured to instruct the at least one satellite to transmit the unitary item of programming content via multicast.

3. The system of claim 1, wherein the at least one teleport is configured to provide the unitary item of programming content to the at least one satellite for transmission to a plurality of vessels, and wherein each of the plurality of vessels comprises at least one storage facility configured to store the unitary item of programming content and make the unitary item of programming content available for playback.

4. The system of claim 3, wherein the unitary item of programming content is sent to the plurality of vessels via directional transmission.

5. The system of claim 1, further comprising the at least one satellite.

6. The system of claim 1, comprising a plurality of teleports, each having at least one corresponding satellite.

7. The system of claim 1, further comprising at least one receive site configured to receive transmissions from the at least one satellite, and wherein the at least one teleport is configured to provide a test file to the at least one satellite for transmission to the at least one receive site.

8. The system of claim 1, wherein the unitary item of programming content comprises a movie, a television program, or a song.

9. A method for delivering content for playback on a vessel, the method comprising acts of:
    (A) providing, by at least one teleport to at least one satellite having a transmission capacity which was at least partially consumed by data transmissions during at least one previous period, a unitary item of programming content for transmission to a seagoing vessel, the act (A) comprising the at least one teleport instructing the at least one satellite to transmit the unitary item of programming content to the seagoing vessel in a manner which is determined based at least in part upon an extent to which the at least one satellite's transmission capacity was consumed during the at least one previous period;
    (B) storing, by at least one storage facility configured for deployment on the vessel, the unitary item of programming content transmitted by the at least one satellite; and
    (C) making, by the at least one storage facility, the unitary item of content available for playback on the vessel.

10. The method of claim 9, wherein the unitary item of programming content comprises a movie, a television program, or a song.

11. The method of claim 9, wherein the act (A) comprises providing the unitary item of programming content to the at least one satellite for transmission via multicast.

12. The method of claim 9, wherein the act (A) comprises providing the unitary item of programming content to the at least one satellite for transmission to a plurality of vessels, and the act (B) comprises storing the unitary item of programming content on each vessel.

13. The method of claim 12, wherein the act (A) comprises providing the unitary item of programming content to the at least one satellite to be sent to the plurality of vessels via directional transmission.

14. The method of claim 9, wherein the act (A) further comprises the at least one satellite sending the unitary item of programming content to the vessel.

15. The method of claim 9, wherein the act (A) comprises providing a plurality of segments, collectively comprising the unitary item of programming content, to the at least one satellite.

16. The method of claim 9, wherein the act (A) comprises providing a test file to the at least one satellite for transmission, and the method further comprises an act of:
(D) providing an indication whether the test file was received from the at least one satellite.

17. At least one computer-readable storage medium having instructions encoded thereon which, when executed in a computer system comprising at least one teleport and at least one storage facility configured for deployment on a seagoing vessel, cause the computer system to perform a method for delivering content for playback on a vessel, the method comprising acts of:
(A) providing, by the at least one teleport to at least one satellite having a transmission capacity which was at least partially consumed by data transmissions during at least one previous period, a unitary item of programming content for transmission to a seagoing vessel, the act (A) comprising the at least one teleport instructing the at least one satellite to transmit the unitary item of programming content to the seagoing vessel in a manner which is determined based at least in part upon an extent to which the at least one satellite's transmission capacity was consumed during the at least one previous period;
(B) storing, by the at least one storage facility, the unitary item of programming content transmitted by the at least one satellite; and
(C) making, by the at least one storage facility, the unitary item of content available for playback on the vessel.

18. The at least one computer-readable storage medium of claim 17, wherein the unitary item of programming content comprises a movie, a television program, or a song.

19. The at least one computer-readable storage medium of claim 17, wherein the act (A) comprises providing the unitary item of programming content to the at least one satellite for transmission via multicast.

20. The at least one computer-readable storage medium of claim 17, wherein the act (A) comprises providing the unitary item of programming content to the at least one satellite for transmission to a plurality of vessels, and the act (B) comprises storing the unitary item of programming content on each vessel.

21. The at least one computer-readable storage medium of claim 20, wherein the act (A) comprises providing the unitary item of programming content to the at least one satellite to be sent to the plurality of vessels via directional transmission.

22. The at least one computer-readable storage medium of claim 17, wherein the act (A) further comprises the at least one satellite sending the unitary item of programming content to the vessel.

23. The at least one computer-readable storage medium of claim 17, wherein the act (A) comprises providing a test file to the at least one satellite for transmission, and the method further comprises an act of:
(D) providing an indication whether the test file was received from the at least one satellite.

24. A method for use on a vehicle, the method comprising acts of:
(A) beginning receipt from a first satellite of a transmission of data constituting a unitary item of programming content;
(B) after receiving a first portion of the data but prior to the transmission being completed, determining that communication with the first satellite has been lost;
(C) in response to the determining, establishing communication with a second satellite and issuing a request for a second portion of the data constituting the unitary item of programming content via the second satellite;
(D) acquiring, on the vehicle, the second portion of the data, without restarting the transmission; and
(E) employing the first portion of the data and the second portion of the data to enable play back of the unitary item of programming content on the vehicle without interruption.

25. The method of claim 24, wherein the request specifies at least one identifier associated with the second portion of the data.

26. The method of claim 24, wherein the act (D) comprises generating a third portion of the data constituting the unitary item of programming content using information included in the first portion of the data, and the act (E) comprises employing the first, second and third portions of the data to enable play back of the unitary item of programming content on the vehicle without interruption.

27. The method of claim 26, wherein the information comprises redundant data, and the act (D) comprises employing at least one error correction algorithm to generate the third portion of the data using the redundant data.

28. The method of claim 24, wherein the first portion of the data and the second portion of the data collectively represent the unitary item of programming content in its entirety.

29. The method of claim 24, wherein the vehicle is a seagoing vessel.

30. At least one computer-readable storage medium having instructions encoded thereon which, when executed in a computer system configured for deployment on a vehicle, cause the computer system to perform a method comprising acts of:
(A) beginning, on the vehicle, receipt from a first satellite of a transmission of data constituting a unitary item of programming content;
(B) after receiving a first portion of the data but prior to the transmission being completed, determining that communication with the first satellite has been lost;
(C) in response to the determining, establishing communication with a second satellite and issuing a request for a second portion of the data constituting the unitary item of programming content via the second satellite;
(D) acquiring, on the vehicle, the second portion of the data, without restarting the transmission; and
(E) employing the first portion of the data and the second portion of the data to enable play back of the unitary item of programming content on the vessel without interruption.

31. The at least one computer-readable storage medium of claim 30, wherein the request specifies at least one identifier associated with the second portion of the data.

32. The at least one computer-readable storage medium of claim 30, wherein the act (D) comprises generating a third portion of the data constituting the unitary item of programming content using information included in the first portion of the data, and the act (E) comprises employing the first, second and third portions of the data to enable play back of the unitary item of programming content on the vehicle without interruption.

33. The at least one computer-readable storage medium of claim 32, wherein the information comprises redundant data, and the act (D) comprises employing at least one error correction algorithm to generate the third portion of the data using the redundant data.

34. The at least one computer-readable storage medium of claim 30, wherein the first portion of the data and the second portion of the data collectively represent the unitary item of programming content in its entirety.

35. The at least one computer-readable storage medium of claim 30, wherein the vehicle is a seagoing vessel.

36. A system, comprising:
   at least one computer processor programmed to:
      begin receipt, on a vehicle, from a first satellite, of a transmission of data constituting a unitary item of programming content;
      determine that communication with the first satellite has been lost after receiving a first portion of the data, but prior to the transmission being completed;
      in response to the determining, establish communication with a second satellite and issue a request for a second portion of the data via the second satellite;
      acquire the second portion of the data on the vehicle, without restarting the transmission;
      employ the first portion of the data and the second portion of the data to enable play back of the unitary item of programming content on the vessel without interruption.

37. The system of claim 36, wherein the request specifies at least one identifier associated with the second portion of the data.

38. The system of claim 36, wherein the at least one computer processor is programmed to generate a third portion of the data constituting the unitary item of programming content using information included in the first portion of the data, and to employ the first, second and third portions of the data to enable play back of the unitary item of programming content on the vehicle without interruption.

39. The system of claim 38, wherein the information comprises redundant data, and the act (C) comprises employing at least one error correction algorithm to generate the third portion of the data using the redundant data.

40. The system of claim 36, wherein the first portion of the data and the second portion of the data collectively represent the unitary item of programming content in its entirety.

41. The system of claim 38, wherein the vehicle is a seagoing vessel.

42. A method for use in a system comprising a first teleport in communication with a first satellite, the first satellite having a capacity to transmit data that is provided to the first satellite by the first teleport, the method comprising acts of:
   (A) determining a rate at which the first satellite transmitted data for receipt by at least one vehicle during at least one previous time period;
   (B) determining, based at least in part on the rate determined in the act (A), a rate at which to provide data to the first satellite for subsequent transmission; and
   (C) providing data to the first satellite at the rate determined in the act (B).

43. The method of claim 42, wherein the act (A) comprises determining a rate at which the first satellite transmitted data during each of a plurality of previous time periods, the plurality of time periods being separated by a predetermined interval.

44. The method of claim 42, wherein the act (A) comprises determining a rate at which the first satellite transmitted data provided by the teleport and at least one other data source during the at least one previous time period.

45. The method of claim 42, wherein the act (B) comprises determining the rate at which to provide data to the first satellite based at least in part on the first satellite's capacity to transmit data.

46. The method of claim 42, wherein the act (A) comprises determining a rate at which the first satellite transmitted data on each of a first plurality of modulation encodings, and the act (C) comprises providing data to the first satellite for transmission on each of a second plurality of modulation encodings.

47. The method of claim 46, wherein the first plurality of modulation encodings and the second plurality of modulation encodings are the same modulation encodings.

48. The method of claim 42, wherein the act (A) comprises determining the first satellite's success in transmitting the data on at least one first modulation encoding during the at least one previous time period, and the act (C) comprises providing data to the first satellite for transmission on at least one second modulation encoding that is different than the at least one first modulation encoding.

49. The method of claim 42, wherein:
   the first teleport is also in communication with a second satellite, the second satellite having a capacity to transmit data provided to the second satellite by the first teleport;
   the act (A) comprises determining a rate at which the second satellite transmitted data during at least one previous time period; and
   the act (C) comprises providing the data to the first satellite for transmission instead of to the second satellite.

50. The method of claim 42, wherein:
   the first teleport is also in communication with a second satellite, the second satellite having a capacity to transmit data provided to the second satellite by the first teleport;
   the act (A) comprises determining a rate at which the second satellite transmitted data during at least one previous time period; and
   the act (C) comprises providing at least some of the data to the first satellite for transmission and at least some of the data to the second satellite for transmission.

51. At least one computer-readable storage medium having instructions encoded thereon which, when executed in a system comprising a first teleport in communication with a first satellite, the first satellite having a capacity to transmit data that is provided to the first satellite by the first teleport, cause the first teleport to perform a method comprising acts of:
   (A) determining a rate at which the first satellite transmitted data for receipt by at least one vehicle during at least one previous time period;
   (B) determining, based at least in part on the rate determined in the act (A), a rate at which to provide data to the first satellite for subsequent transmission; and
   (C) providing data to the first satellite at the rate determined in the act (B).

52. The at least one computer-readable storage medium of claim 51, wherein the act (A) comprises determining a rate at which the first satellite transmitted data during each of a plurality of previous time periods, the plurality of time periods being separated by a predetermined interval.

53. The at least one computer-readable storage medium of claim 51, wherein the act (A) comprises determining a rate at which the first satellite transmitted data provided by the teleport and at least one other data source during the at least one previous time period.

54. The at least one computer-readable storage medium of claim 51, wherein the act (B) comprises determining the rate at which to provide data to the first satellite based at least in part on the first satellite's capacity to transmit data.

55. The at least one computer-readable storage medium of claim 51, wherein the act (A) comprises determining a rate at which the first satellite transmitted data on each of a first plurality of modulation encodings, and the act (C) comprises providing data to the first satellite for transmission on each of a second plurality of modulation encodings.

56. The at least one computer-readable storage medium of claim 55, wherein the first plurality of modulation encodings and the second plurality of modulation encodings are the same modulation encodings.

57. The at least one computer-readable storage medium of claim 51, wherein the act (A) comprises determining the first satellite's success in transmitting the data on at least one first modulation encoding during the at least one previous time period, and the act (C) comprises providing data to the first satellite for transmission on at least one second modulation encoding that is different than the at least one first modulation encoding.

58. The at least one computer-readable storage medium of claim 51, wherein:
the first teleport is also in communication with a second satellite, the second satellite having a capacity to transmit data provided to the second satellite by the first teleport;
the act (A) comprises determining a rate at which the second satellite transmitted data during at least one previous time period; and
the act (C) comprises providing the data to the first satellite for transmission instead of to the second satellite.

59. A first teleport, in communication with a first satellite, the first satellite having a capacity to transmit data that is provided to the first satellite by the first teleport, the first teleport comprising:
at least one processor, programmed to;
determine a first rate at which the first satellite transmitted data for receipt by at least one vehicle during at least one previous time period;
determine, based at least in part on the first rate, a second rate at which to provide data to the first satellite for subsequent transmission; and
provide data to the first satellite at the second rate.

60. The first teleport of claim 59, wherein the at least one processor is programmed to determine the first rate by determining a rate at which the first satellite transmitted data during each of a plurality of previous time periods, the plurality of time periods being separated by a predetermined interval.

61. The first teleport of claim 59, wherein the at least one processor is programmed to determine the first rate by determining a rate at which the first satellite transmitted data provided by the teleport and at least one other data source during the at least one previous time period.

62. The first teleport of claim 59, wherein the at least one processor is programmed to determine the second rate based at least in part on the first satellite's capacity to transmit data.

63. The first teleport of claim 59, wherein at least one processor is programmed to determine a first rate at which the first satellite transmitted data on each of a first plurality of modulation encodings, and to provide the data to the first satellite for transmission on each of a second plurality of modulation encodings.

64. The first teleport of claim 63, wherein the first plurality of modulation encodings and the second plurality of modulation encodings are the same modulation encodings.

65. The first teleport of claim 59, wherein the at least one processor is programmed to determine the first satellite's success in transmitting the data on at least one first modulation encoding during the at least one previous time period, and to provide data to the first satellite for transmission on at least one second modulation encoding that is different than the at least one first modulation encoding.

66. A method, comprising acts of:
(A) providing data, by at least one teleport, to a satellite, for transmission by the satellite to at least one vehicle;
(B) receiving, by the at least one teleport, an indication, from at least one land-based receive site which received from the satellite the data provided in the act (A), relating to receipt of the data by the receive site;
(C) in response to receiving the indication, causing, by the at least one teleport, a manner in which the satellite transmits information to the at least one vehicle to be modified.

67. The method of claim 66, wherein the indication received in the act (B) relates to whether the data was received by the at least one land-based receive site.

68. The method of claim 66, wherein the indication received in the act (B) relates to a condition of the data upon receipt by the at least one land-based receive site.

69. The method of claim 66, wherein the act (C) comprises modifying a modulation encoding on which information is transmitted to the at least one vehicle.

70. The method of claim 66, wherein the act (C) comprises temporarily suspending transmissions by the satellite to the at least one vehicle.

71. The method of claim 66, wherein the act (A) comprises providing the data to the satellite for transmission to the at least one vehicle via multicast.

72. At least one computer-readable storage medium having instructions encoded thereon which, when executed in a computer system, cause the computer system to perform a method comprising acts of:
(A) providing data, by at least one teleport, to a satellite, for transmission by the satellite to at least one vehicle;
(B) receiving, by the at least one teleport, an indication, from at least one land-based receive site which received from the satellite the data provided in the act (A), relating to receipt of the data by the receive site;
(C) in response to receiving the indication, causing, by the at least one teleport, a manner in which the satellite transmits information to the at least one vehicle to be modified.

73. The at least one computer-readable storage medium of claim 72, wherein the indication received in the act (B) relates to whether the data was received by the at least one land-based receive site.

74. The at least one computer-readable storage medium of claim 72, wherein the indication received in the act (B) relates to a condition of the data upon receipt by the at least one land-based receive site.

75. The at least one computer-readable storage medium of claim 72, wherein the act (C) comprises modifying a modulation encoding on which information is transmitted to the at least one vehicle.

76. The at least one computer-readable storage medium of claim 72, wherein the act (C) comprises temporarily suspending transmissions by the satellite to the at least one vehicle.

77. The at least one computer-readable storage medium of claim 72, wherein the act (A) comprises providing the data to the satellite for transmission to the at least one vehicle via multicast.

78. A system, comprising:
- at least one teleport, configured to provide data, to a satellite, for transmission by the satellite to at least one vehicle; and
- at least one land-based receive site, configured to receive from the satellite the data provided by the at least one teleport and to provide an indication to the at least one teleport relating to receipt of the data by the receive site;

wherein the teleport is configured to cause the satellite to modify a manner in which the satellite transmits information to the at least one vehicle based at least in part on the indication.

79. The system of claim 78, wherein the at least one land-based receive site is configured to provide an indication relating to whether the data was received by the at least one land-based receive site.

80. The system of claim 78, wherein the at least one land-based receive site is configured to provide an indication relating to a condition of the data upon receipt by the at least one land-based receive site.

81. The system of claim 78, wherein the at least one teleport is configured to cause the satellite to modify a modulation encoding on which information is transmitted to the at least one vehicle based at least in part on the indication.

82. The system of claim 78, wherein the at least one teleport is configured to cause transmissions by the satellite to the at least one vehicle to be temporarily suspended based at least in part on the indication.

83. The system of claim 78, wherein the at least one teleport is configured to provide data to the satellite for transmission to the at least one vehicle via multicast.

* * * * *